United States Patent [19]
Kitadate

[11] Patent Number: 5,649,201
[45] Date of Patent: Jul. 15, 1997

[54] PROGRAM ANALYZER TO SPECIFY A START POSITION OF A FUNCTION IN A SOURCE PROGRAM

[75] Inventor: Yohtaro Kitadate, Kawasaki, Japan

[73] Assignee: Fujitsu Limited, Kawasaki, Japan

[21] Appl. No.: 739,215

[22] Filed: Oct. 29, 1996

Related U.S. Application Data

[63] Continuation of Ser. No. 136,122, Oct. 14, 1993, abandoned.

[30] Foreign Application Priority Data

Oct. 14, 1992 [JP] Japan ..................... 4-275614

[51] Int. Cl.⁶ ..................................... G06F 9/45
[52] U.S. Cl. ..................... 395/704; 395/183.14
[58] Field of Search ..................... 395/703, 704, 395/708, 183.14, 183.15

[56] References Cited

U.S. PATENT DOCUMENTS

| | | | |
|---|---|---|---|
| 4,667,290 | 5/1987 | Goss et al. | 364/300 |
| 5,293,629 | 3/1994 | Conley et al. | 395/700 |
| 5,317,509 | 5/1994 | Caldwell | 364/419.08 |
| 5,361,351 | 11/1994 | Lenkov et al. | 395/700 |
| 5,408,660 | 4/1995 | Kitadate | 395/650 |

OTHER PUBLICATIONS

Borland, "C++ Version 3.0 Programmer's Guide", Borland International Inc., 1991, pp. 1 and 21–24.

*Primary Examiner*—Thomas M. Heckler
*Assistant Examiner*—Dennis M. Butler
*Attorney, Agent, or Firm*—Staas & Halsey

[57] ABSTRACT

A program analyzer in which a part of an inputted C-source program is either a declaration or a function definition. To define a start position of the function designated in the C-source program at high speed and high precision, a DD-detection processor is provided for detecting a direct declarator or a character/token ";" in the outside of the characters/tokens "{" and "}" of the part of the C-source program. An identification processor determines that the C-source program is the declaration when the DD-detection processor detects the character/token ";". The identification processor further determines that the C-source program is the declaration when the DD-detection processor detects the direct declarator and further detects that the next character/token of the direct declarator indicates one of characters/tokens "=", ",", and ";". The identification processor further determines that the C-source program is the function definition when the DD-detection processor detects the direct declarator and further detects that the next character/token of the direct declarator indicates the characters/tokens except for above mentioned characters/tokens.

16 Claims, 13 Drawing Sheets

Fig. 3

| CLASS | CHARACTER POSITION IN A LINE | LINE POSITION | CHARACTER POSITION IN FILE | TOKEN LITERAL |
|---|---|---|---|---|

Fig. 4

| FUNCTION NAME | START CHARACTER POSITION IN A LINE | START LINE POSITION | CHARACTER POSITION IN FILE |
|---|---|---|---|
| | | | |
| ⋮ | ⋮ | ⋮ | ⋮ |

Fig.11

| SEQUENCE OF DETECTED TOKEN | RESULT OF IDENTIFICATION |
|---|---|
| DD  DS  ;  { } | FUNCTION DEFINTION |
| DD  { } | FUNCTION DEFINTION |
| DD  ,  ; | DECLARATION |
| DD  =  ; | DECLARATION |
| DD  ; | DECLARATION |
| ; | DECLARATION |
| TD  ... | TYPE DEFINITION (A KIND OF DECLARATION) |

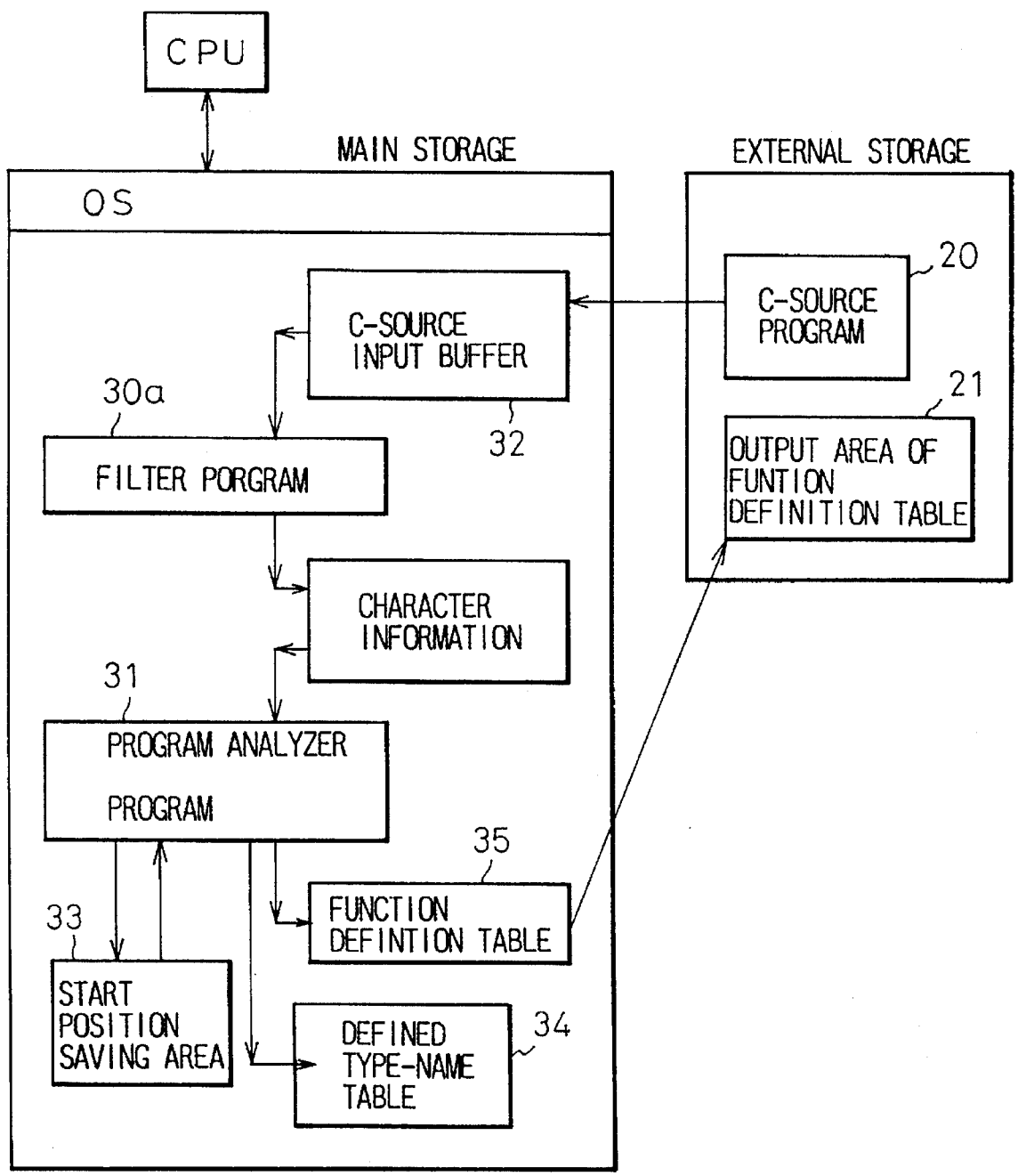

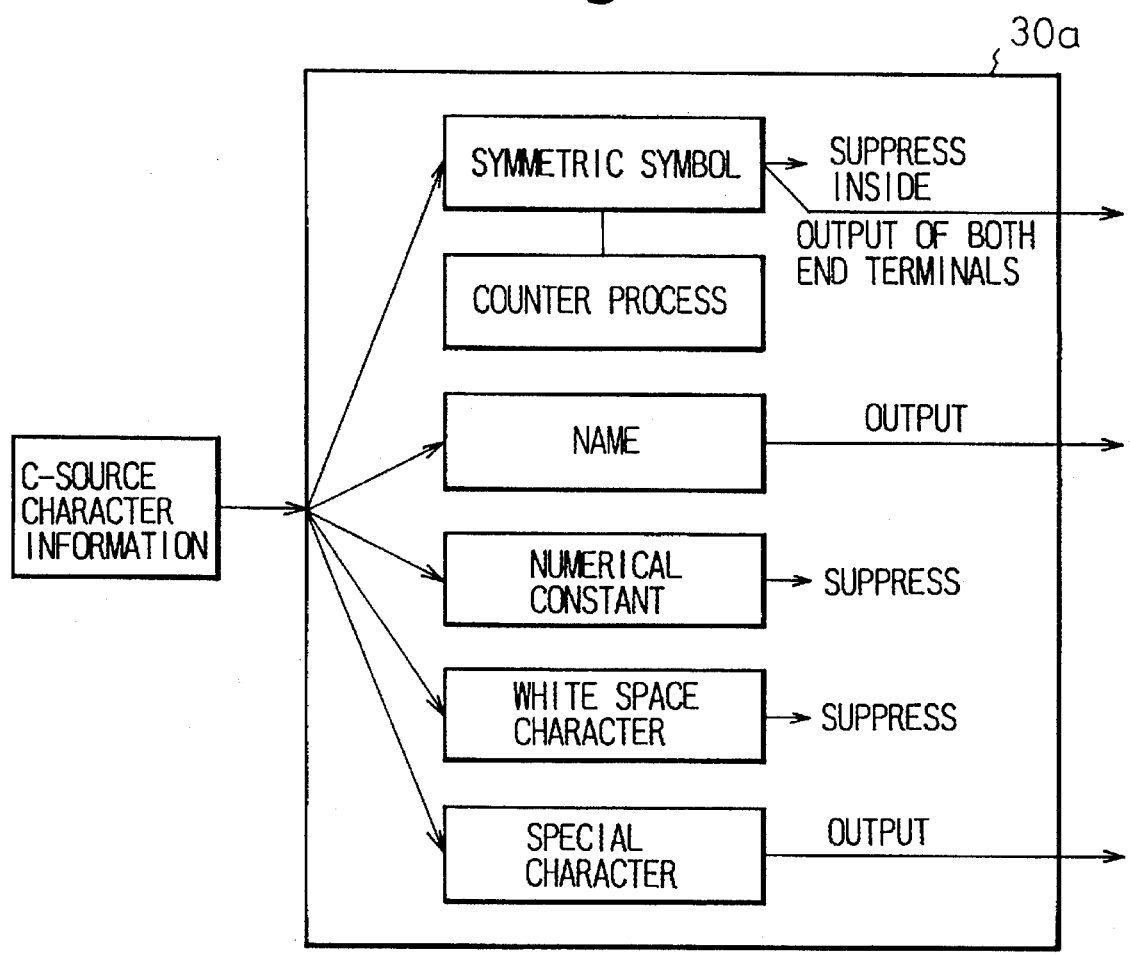

PROGRAM ANALYZER TO SPECIFY A START POSITION OF A FUNCTION IN A SOURCE PROGRAM

This application is a continuation of application Ser. No. 08/136,122, filed Oct. 14, 1993, now abandoned.

BACKGROUND OF THE INVENTION

1. Field of the Invention

The present invention relates to a program analyzer for analyzing a source program written in a C-language, and more particularly, the present invention relates to a program analyzer which can specify a start position of a function having a function name designated by a programmer in the source program at high speed and high precision.

2. Description of the Related Art

When describing a source program by using a programming language, compiling the source program to a machine language by using a compiler and executing the machine language, as a result of execution, an unexpected result happens to occur due to programming failures, or an abnormal completion is found during execution. When these failures occur, it is necessary to investigate conditions in which such failure occurs, and to trace out the position in which such programming failure occurs.

For example, a method using a support program which is called debugger is widely used as one method. According to this method, when using the support program, since it is possible to find the function name of the function (subroutine) which is finally executed in the program based on a state of a register and a main storage in a CPU at abnormal completion, it is possible to effectively execute the above investigation and trace.

In addition to the support program, if there is provided an interactive program which supports a review of the description of the function having a designated function name, it is expected that working efficiency is improved. The interactive program requires a time shortened from designation of the function name until start of analysis. To realize shortened time, it is required to quickly obtain the start position of the function from the designated function name.

Although the program by the C-language has sets of a declaration and a function definition, there are no special symbol and character sequence for indicating identification of the declaration and the function definition and designating the start and end of both declaration and function definition. From this reason, to obtain the start position of the designated function, it is necessary to sequentially define the end position of both declaration and function definition from a head of the program. As one method for defining the end position, there is a method for sequentially analyzing the start position from the head of the program according to a grammatical rule. That is, as well as a syntax analysis at the compiler, this is a method for defining the end position of the declaration and the function definition one by one by producing a parse tree and applying a production rule of the C-language in detail to the program.

As another method, there is a method for utilizing a started character position in a line of each function, which is output to an object program as a symbol information, when the compiler performs translation process.

However, according to the former art, since this is a method for defining the end position of the declaration and the function definition one by one by sequentially analyzing the end position from the head of the program based on the syntax rule and applying the production rule of the C-language in detail to the program, there is a problem in which a lot of time is required until the target function is obtained.

Further, according to the latter art, although it is possible to realize a high speed processing compared with the former art, the started character position in a line is not indicated in the strict sense of the word. Accordingly, there is a problem in which, for example, the latter happens to indicate the character position in which the function name exists. Further, there is a problem in which it is impossible to indicate the start position of the function using the character position in a line. This is because, in the C-language, it is logically possible to describe a plurality of functions in one character position in a line.

SUMMARY OF THE INVENTION

The present invention is provided to solve the above mentioned problems. The present invention aims to a process for a source program of a C-language ensuring that no grammatical errors are contained. Accordingly, the object of the present invention is to provide an improved program analyzer which can define the start position of the designated function in the source program in the C-language at high speed and high precision.

According to one aspect of the present invention, the present invention has a structure which inputs a C-source program which is formed by a unit of character or token (character/token) and determining whether a part of C-source program is a declaration or a function definition. The program analyzer includes a DD-detection processor (10) for detecting a direct declarator or the character/token ";" in the outside of the characters/tokens "{" and "}" of the part of the C-source program, and an identification processor (11) for performing an identification of the part of the C-source program.

The identification processor determines the part of C-source program as the declaration when the DD-detection processor (10) detects the character/token ";".

Further, the identification processor determines the part of C-source program as the declaration when the DD-detection processor (10) detects the direct declarator and further detects that next character/token of that direct declarator is one of characters/tokens "=", "," and ";".

Still further, the identification processor determines the part of C-source program as the function definition when the DD-detection processor (10) detects the direct declarator and further detects that next character/token of that direct declarator is one of the characters/tokens except for above mentioned characters/tokens "=", "," and ";".

According to another aspect of the present invention, the present invention has a structure which inputs a C-source program which is formed by a unit of character or token (character/token) and determining whether a part of C-source program indicates the declaration or the function definition. The program analyzer includes a DD-detection processor (10) for detecting a direct declarator or the character/token ";" in the outside of the characters/tokens "{" and "}" of the part of the C-source program, and an identification processor (11) for performing an identification of the part of the C-source program.

The identification processor determines the C-source program as the declaration when the DD-detection processor (10) detects the character/token ";".

Further, the identification processor determines the part of C-source program as the declaration when the DD-detection processor (10) detects the direct declarator, and further detects that next character/token of a first identifier of the direct declarator is "(" and next character/token of that direct declarator is "," or ";".

Still further, the identification processor determines the part of C-source program as the function definition when the DD-detection processor (10) detects the direct declarator and further detects that next character/token of that direct declarator is one of the characters/tokens except for above mentioned characters/tokens "," and ";".

Still further, the identification processor determines the part of C-source program as the declaration when the DD-detection processor (10) detects the direct declarator and further detects that next character/token of the first identifier of the direct declarator is one of the characters/tokens except for the character/token "(".

BRIEF DESCRIPTION OF THE DRAWINGS

In the drawings:

FIG. 3 is an explanatory view of a token information;

FIG. 4 is an explanatory view of data structure of a function definition list;

FIG. 11 is an explanatory view of one example of a token sequence and result of identification;

FIG. 13 shows still another embodiment of the present invention;

FIG. 14 is an explanatory view of an input/output information of filter program; and FIGS. 15A and 15B are explanatory views an output form of information of the filter program.

DESCRIPTION OF THE PREFERRED EMBODIMENTS

Figure 1:
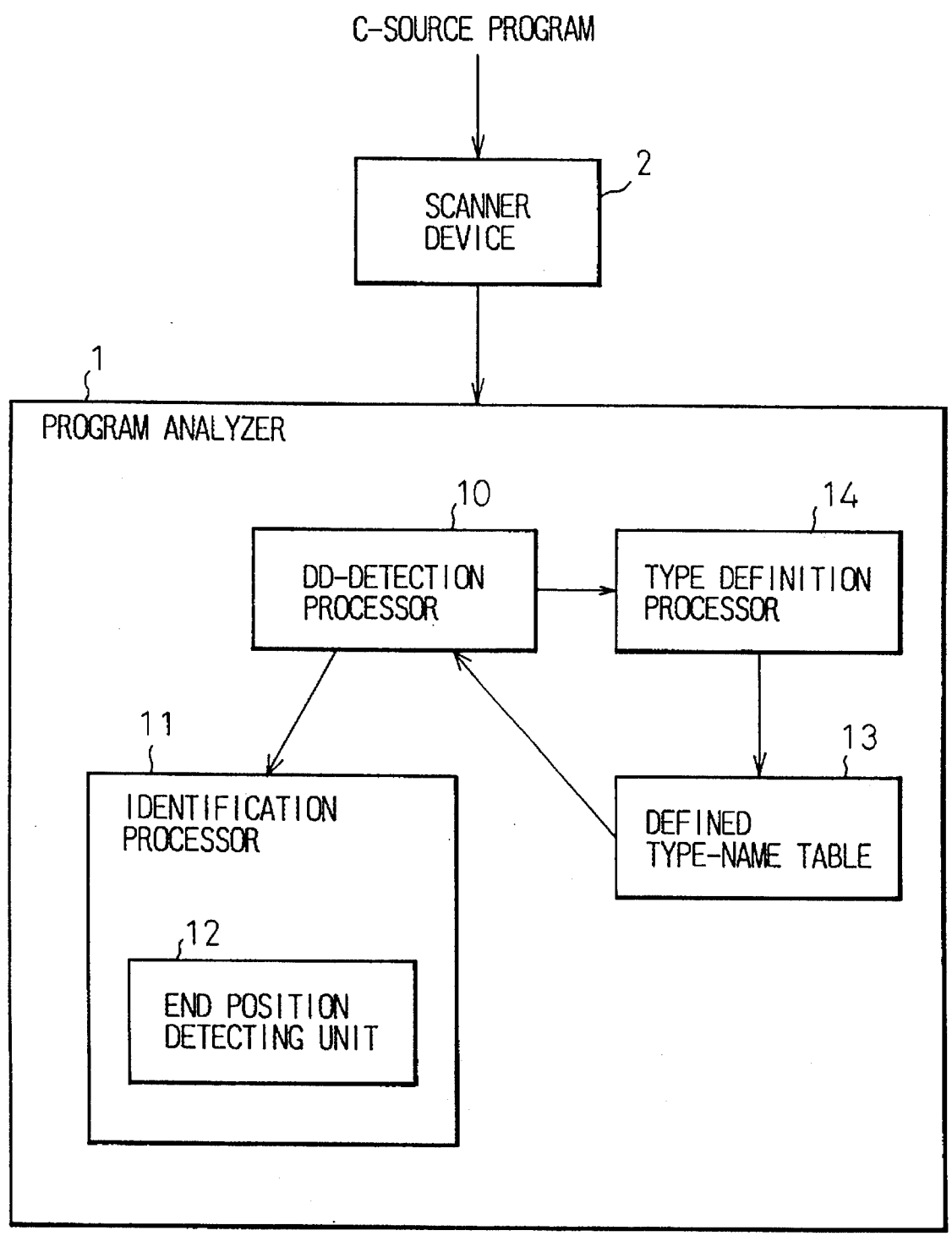
FIG. 1 is a structural view indicating a principle of the present invention.

FIG. 1 shows a basic structure of the present invention. In the drawing, reference number 1 denotes a program analyzer of the present invention. The program analyzer has a structure receiving a C-source program which is input by a unit of character or token (below, character/token) and determines whether a part of the C-source program is the declaration or the function definition. Reference number 2 denotes a scanner which analyzes the C-source program which becomes a target of analysis in accordance with the character/token, and inputs the analyzed C-source program to the program analyzer 1.

The program analyzer 1 of the present invention includes a DD-detection processor 10 for detecting the direct declarator or the character/token ";"; an identification processor 11 for receiving result of detection at the DD-detection processor 10, executing identification process of an input token and determining whether the input C-source program is the declaration or the function definition; an end position detector 12 for detecting the end position of the declaration and the function definition which is input from the identification processor 11; a defined type-name table 13 for managing a type of a user definition (this corresponds to "int" and "char"); and a type-definition processor 14 for executing registration process to the defined type-name table 13.

In the present invention, when the DD-detection processor 10 detects the character/token ";" in the outside of the characters/tokens "{" and "}" of a part of the input C-source program, and determines the program existing before the character/token ";" as one declaration.

At the same time, the DD-detection processor 10 detects the direct declarator in the outside of the characters/tokens "{" and "}" of a part of the input C-source program. The detection process of the direct declarator are performed in such a way that, in the outside of the characters/tokens "{" and "}" of a part of the input C-source program, when DD-detection processor 10 detects an identifier (this corresponds to a variable name or a function name) which does not position just after the characters/tokens "struct", "union", or "enum", the DD-detection processor 10 skips the characters/tokens consisting of "(..)" and "[..]" which follows the identifier, and further detects occurrence of the direct declarator at the last of the skipped portion.

Further, in the outside of the characters/tokens "{" and "}" of a part of the input C-source program, when the DD-detection processor 10 detects the character/token "(" and further detects the character/token ")" which becomes a pair of the character/token "(", and skips the characters/tokens consisting of "(..)" and "[..]" which follows the character/token ")", then, detects the direct declarator at the last of the skipped portion.

In the above, the detection of the character/token "(" is suppressed. In the outside of the characters/tokens "{" and "}" of a part of the input C-source program, when the DD-detection processor 10 detects an identifier which does not position just after the characters/tokens "struct", "union", or "enum", the DD-detection processor 10 skips the character/token ")" and the characters/tokens consisting of "(..)" and "[..]" occurred just after the identifier, and further detects the direct declarator at the last of the skipped portion.

When the DD-detection processor 10 detects the direct declarator in the outside of the characters/tokens "{" and "}" of a part of the input C-source program, the identification processor 11 judges whether the next input of the direct declarator is one of the characters/tokens "=", "," and ";". When the identifier processor 11 detects one of the characters/tokens "=", and ";", it determines a part of the input C-source program as the declaration. At that time, the end position detector 12 determines the program existing before the character/token ";" as one declaration when the identifier processor 11 detects that next input of the direct declarator is the character/token ";".

Further, when the identification processor 11 detects that next input of the direct declarator is the character/token "=" or ",", the end position detector 12 detects the character/token ";" in the outside of the characters/tokens "(..)", "{..}", "[..]", """..""" and "'..'" and determines the program until these characters/tokens as one declaration.

When the identification processor 11 detects that next input of the direct declarator is none of three characters/ tokens above, it determines the part of the input C-source program as the function definition. At that time, the end detector 12 detects the character/token "}" which corresponds to the character/token "{" when the identification processor 11 detects that next input of the direct declarator is the character/token "{", and determines the program until that characters/tokens as one function definition.

Further, when identification processor 11 detects that next input of the direct declarator is the characters/tokens except for the characters/tokens ";", "=", ",", and "{", the identifier processor 11 detects the characters/tokens ";" and "{" which becomes sequential pair, and further detects the character/token "}" which corresponds to the character/token "{" and determines the program until that character/token as one function definition.

Further, when the DD-detection processor 10 detects the character/token in the outside of the characters/tokens "{" and "}" of a part of the input C-source program, the identification processor 11 detects that next of the first identifier of the direct declarator is the character/token "(", and further detects whether the input following the direct declarator is the character/token "," or ";". When the identifier processor 11 detects the above state of the character/token, it determines a part of the input C-source program as the declaration.

Further, when the identification processor 11 detects that the next of the first identifier of the direct declarator is the character/token "(" and next input following the direct declarator is neither the characters/tokens "," nor ";", it determines the part of the input C-source program as the function definition. On the other hand, the identification processor 11 detects that next of the first identifier of the direct declarator is the characters/tokens except for the character/token "(", it determines the part of the input C-source program as the declaration.

Further, the DD-detection processor 10 has a structure for detecting the character/token "typedef" in the outside of the characters/tokens "{" and "}" in a part of the input C-source program to exclude the type from the DD-detection process when the type of the user definition is included in the C-source program. When the DD-detection processor 10 detects occurrence of the character/token "typedef", it determines a part of the input C-source program as the declaration. The type-definition processor 14 registers the type of the user definition which follows after the "typedef" into the defined type-name table 13. The DD-detection processor 10 does not deal with the type name, which is registered in the defined type-name table 13, as the identifier so that it is possible to be excluded from the detection process of the identifier.

As mentioned above, according to the present invention, since it is possible to determine the start position of the designated function in the C-source program without the production of the parse tree, without application of the production rule of the C-language for details as the program, and without use of the symbol information obtained by the compiler, it is possible to obtain the start position of the designated function in the C-source program at high speed and high precision.

Figure 2:
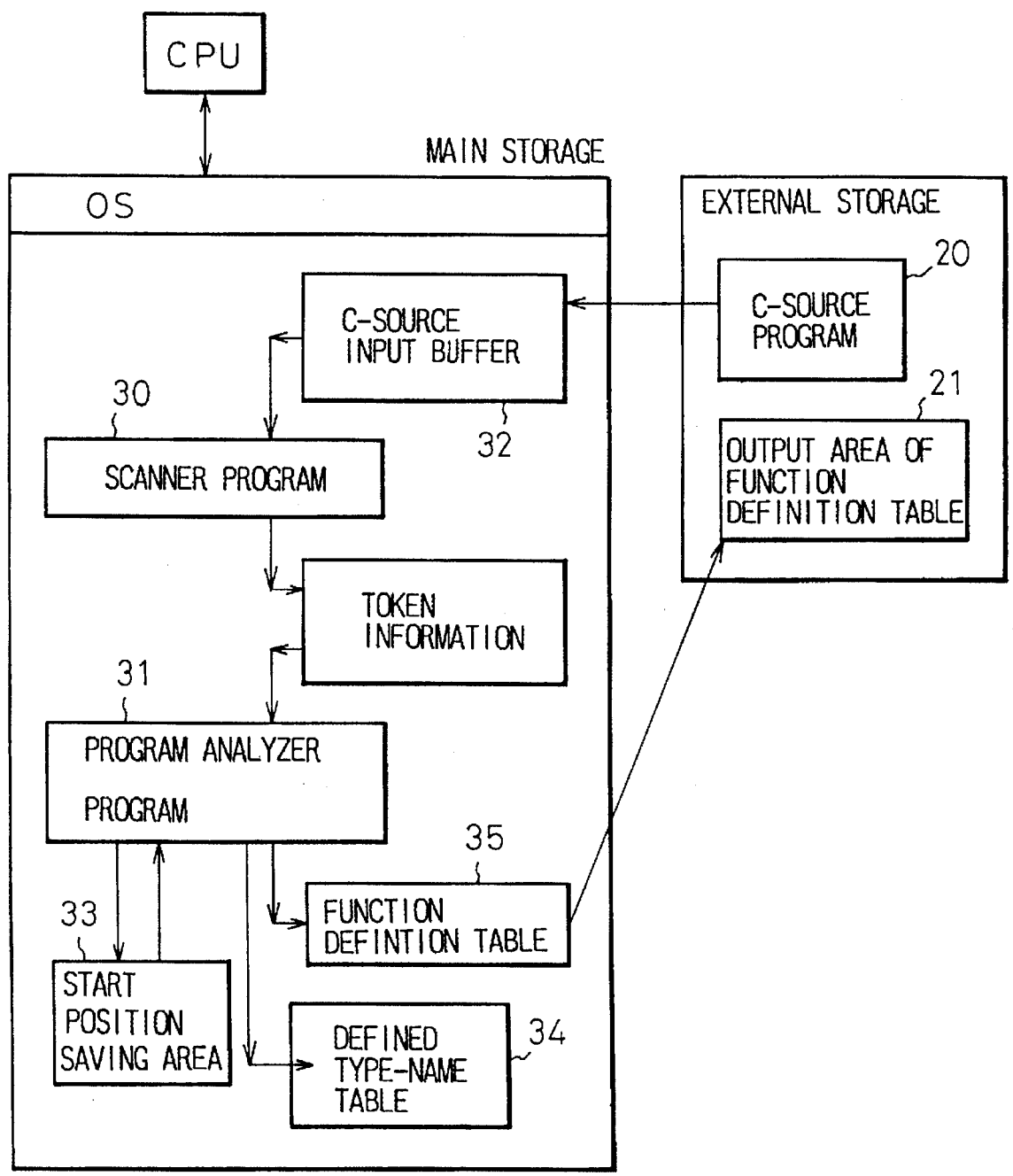
FIG. 2 shows one embodiment of the present invention.

FIG. 2 shows one embodiment of the present invention which is realized on a digital computer. In the drawing, reference number 20 denotes a source program given as the object of analysis which is stored in an external storage device. This source program is written in the C-language which is given by a file-inclusion process and a macro-expansion process. Reference number 21 denotes an output area of the function definition table which is developed in the external storage device. This area is provided for managing the position information of the function definition of the C-source program 20 of the present invention.

Reference number 30 denotes a scanner program, 31 denotes a program of the program analyzer which is developed on a main storage, 32 denotes a C-source input buffer which is developed on the main storage, 33 denotes a start position saving area which is developed on the main storage, 34 denotes a defined type-name table, and 35 denotes a function definition table which is developed on the main storage.

The scanner program 30 reads the C-source program 20 which is stored on the external storage device into the C-source input buffer 32 by requesting the process to an operating system OS. Further, the scanner program 30 takes some continuous characters as one token from the character sequence which is input to the C-source input buffer 32, creates the token information and outputs the same. The scanner program 30 transfers the created token information to the program of the program analyzer 31 for every creation of one token information.

The tokens which are output from the scanner program 30 include keywords such as "if" and "else", identifiers such as the variable name and the function name which are defined in the program, constants, character sequences, and operators such as "+" and "−". In this case, there are two methods. One is a method of handling a character constant "'."' and the character sequence "''.."" of the C-language as one token. The other is a method of handling a single character "'"'' and "'"''" as the token, and handling these as one of symmetric symbols. The following embodiment employs the former, i.e., the method of handling the character constant and the character sequence as one token.

As shown in FIG. 3, the token information which is output from the scanner program 30 includes a token class (identifier, if, else, +, −), the position of the head character of the token in the file, the character position in the source program, the position of a line, and the character sequence of a literal token (identifier, constant, and contents of the character sequences defined).

On the other hand, the program analyzer 31 sequentially obtains the token information by using a communication between programs or by calling the scanner program 30 as the sub-routine. Further, regarding the head token of one declaration or the function definition, the program analyzer 31 stores the position information of the token into the start position saving area 33, determines whether the input token indicates the declaration or the function definition in accordance with the following processes, and outputs the function name and the start position information to the function definition table 35 for every completion of one function definition. Further, when the program analyzer 31 analyzes the token until the end of the C-source program 20, it outputs data which is developed in the function definition table 35 to the output area of the function definition table 21 of the external storage device.

FIG. 4 shows data structure of the function definition table 35. As shown in this drawing, the function definition table 35 includes the data structure for managing the function name, the started character position in a line on the C-source program 20, and the character position indicating the start position in the file of the function definition.

Next, analyzing processes of the C-source program which are executed in the program of the program analyzer 31 are explained in detail below.

Figure 5:
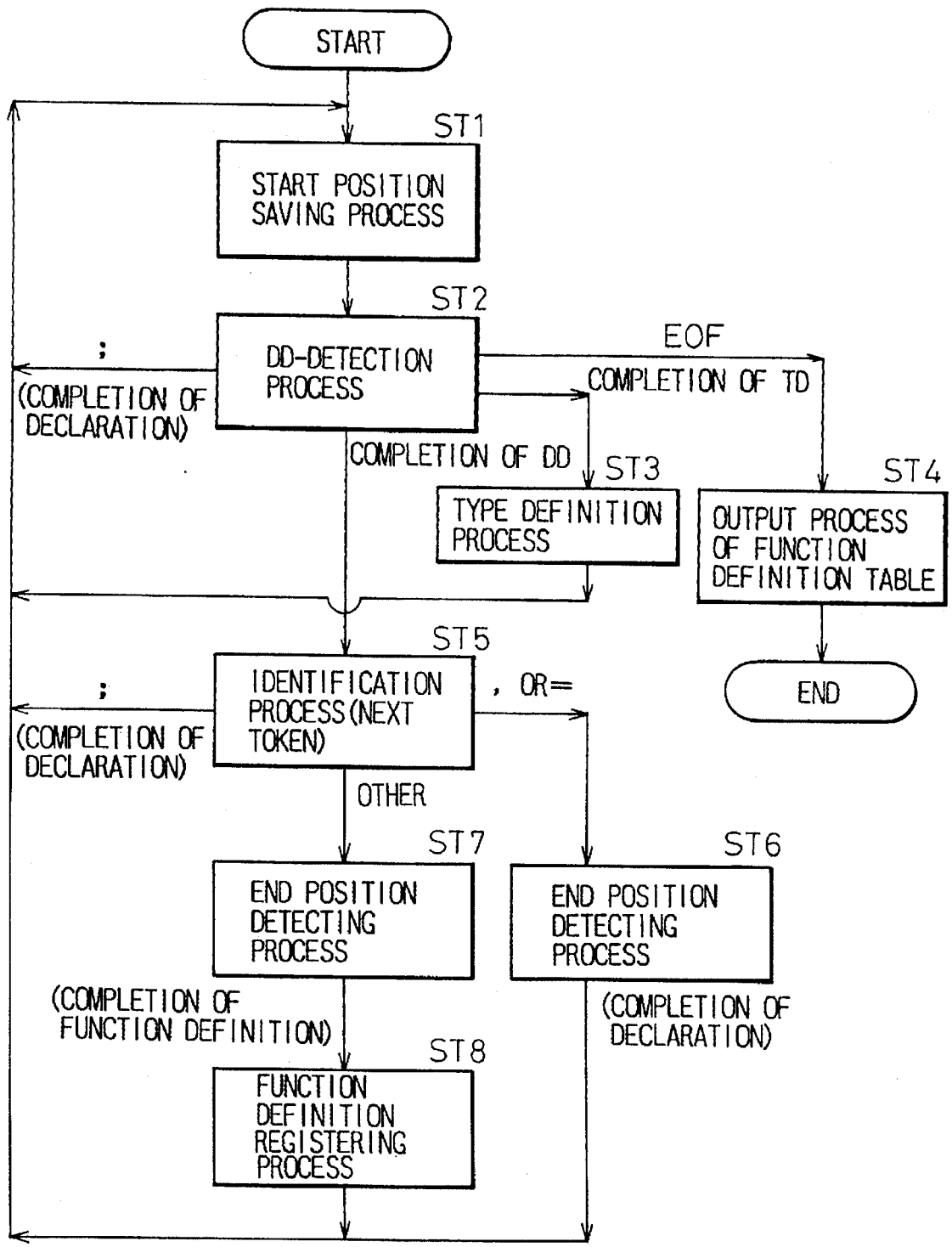
FIG. 5 shows one example of process flow of main routine executed by a program of the program analyzer.
Figure 6:
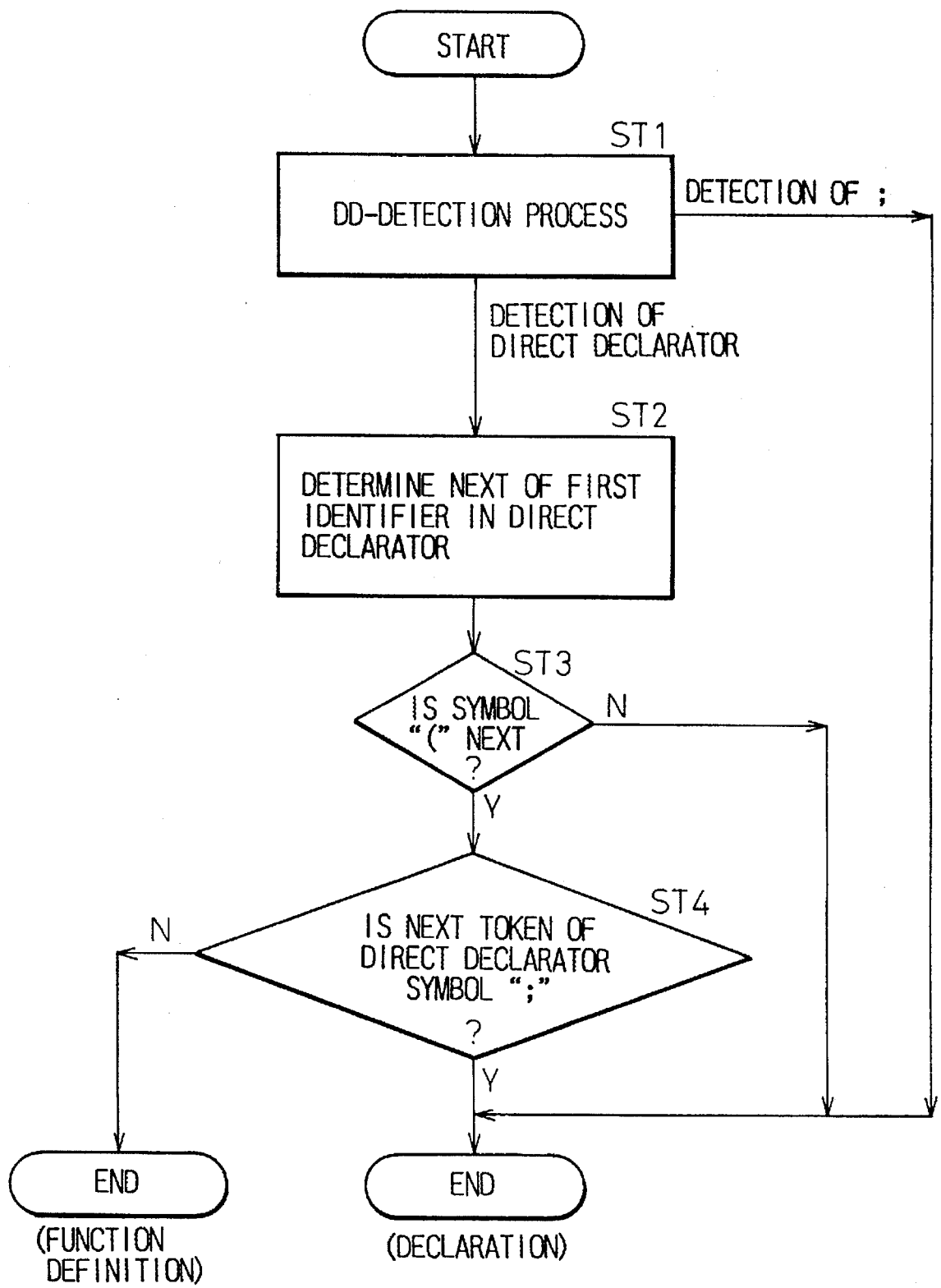
FIG. 6 shows another example of process flow of main routine executed by the program of the program analyzer.

FIGS. 5 and 6 show one embodiment of the process flow of the main routine which are executed in the program analyzer 31.

In FIG. 5, in step ST1, the program analyzer 31 calls the start position saving process of the subroutine, and saves the position information of the head token into the start position saving area 33. In step ST2, the program analyzer 31 calls the DD-detection process of the subroutine, and detects the characters/tokens ";", the direct declarator (DD), "typedef (TD)", or "EOF (end of file)".

In accordance with step ST2, when the program analyzer 31 detects the character/token ";", it determines the program part before the character/token ";", as the declaration, and the control returns to step ST1. On the other hand, when the program analyzer 31 detects the character/token "typedef", it determines the character/token as the declaration, and the control returns to step ST3. In step ST3, the program analyzer 31 calls the type-definition process as the subroutine, and it registers the type-name of the user definition which follows the "typedef" into the defined type-name table 34. The control returns to step ST1. The DD-detection processor does not process the type-name which is registered in the defined type-name table 34 as the identifier, and also does not process the type-name of the user definition which follows "typedef" as the identifier.

On the other hand, when the program analyzer 31 detects the "EOF" it proceeds to step ST4 and calls the output process of the function-definition table of the subroutine, and outputs the data which is developed in the function definition table 35 to the output area 21 of the function definition table of the external storage device.

Further, in accordance with the DD-detection process in step ST2, when the program analyzer 31 detects the direct declarator (DD), it proceeds to step ST5 and calls the identification process as the subroutine, and determines whether next token of the direct declarator is any one of the characters/tokens "=", ",", and ";". When the program analyzer 31 detects the character/token ";", in accordance with the identification process of step ST5, it determines the program part before the character/token ";" as the declaration. The step returns to step ST1.

Further, the program analyzer 31 detects the character/token "=" or ",", it proceeds to step ST6 and calls the end position detecting process of the subroutine. Further, the program analyzer 31 detects the character/token ";" in the outside of symmetric symbol, and determines the program part before this character/token as the declaration. The control returns to step ST1.

In accordance with the identification process in step ST5, the program analyzer 31 detects that next token of the direct declarator is none of the characters/tokens "=", "," or ";" it determines this character/token as the function definition. Further, the program analyzer 31 proceeds to step ST7 and calls the end position detection process of the subroutine. When the next input of the direct declarator is the character/token "{", the program analyzer 31 detects the character/token "}" which becomes a pair of the character/token "{", and determines the program before this character/token as the function definition.

When the next input of the direct declarator is the character/token except for the character/token "{", the program analyzer 31 detects the consecutive pair of the characters/tokens ";" and "{", and further detects the character/token "}" which corresponds to the character/token "{", and determines the program before this character/token as the function definition. The program analyzer 31 proceeds to step ST8 and calls the function definition registering process as the subroutine, and registers the detected function name and the start position information of the function into the function definition table 35. The control returns to step ST1.

As explained above, the program analyzer 31 performs the detection process of the function name which is described in the C-source program which becomes the target of the analysis, and also performs the detection process of the start position information of the function in accordance with the flowchart shown in FIG. 5.

On the other hand, the program analyzer 31 performs the call of the DD-detection process of the subroutine in step ST1, and also performs the detection process of the character/token ";" and the direct declarator in the outside of the characters/tokens "{" or "}" of a part of the input C-source program 20.

In accordance with the DD-detection process in step ST1, when the program analyzer 31 detects the character/token ";" it determines the part of program before the character/token ";" as the declaration. On the other hand, when the program analyzer 31 detects the direct declarator, it checks whether the next of the first identifier of the direct declarator indicates the character/token "(" in step ST2. Further, in step ST3, when the program analyzer 31 determines that next of the first identifier of the direct declarator is not the character/token "(", it determines that the input C-source program 20 indicates the declaration.

In step ST3, when the program analyzer 31 detects that the next of the first identifier in the direct declarator is the character/token "(", in step ST4, it detects whether the next token following the direct declarator indicates the characters/tokens "," or ";". When the program analyzer 31 detects either the characters/tokens "," or ";" it determines that the input part of C-source program 20 is the declaration. When the program analyzer 31 detects that the character/token is neither "," nor ";", it determines that the input part of C-source program 20 is the function definition.

In the embodiment shown in FIG. 6, the program analyzer 31 can determine whether the input portion of the C-source program 20 which is the object of the analysis is the function definition or the declaration in accordance with the process flowchart of FIG. 6.

Figure 7:
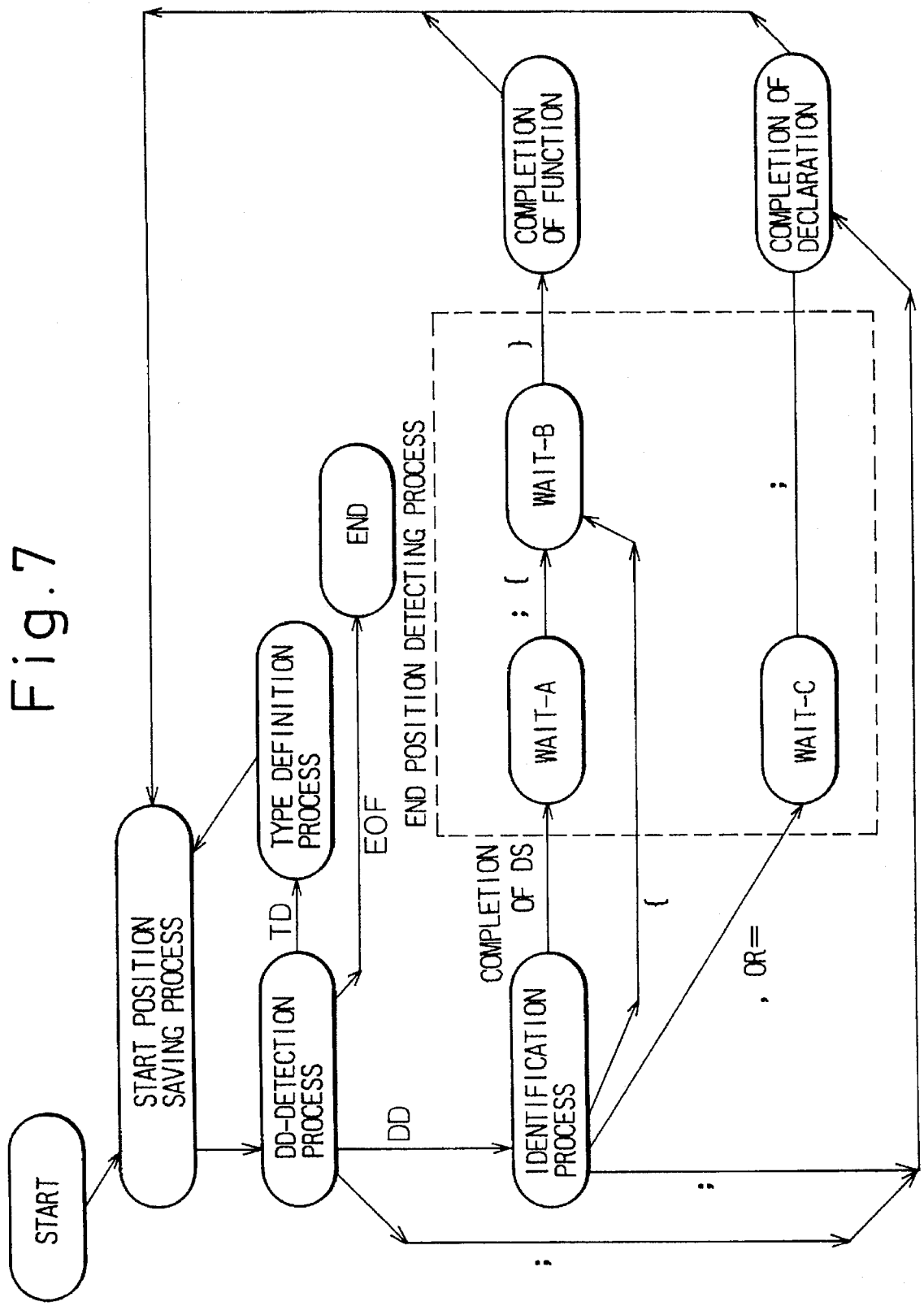
FIG. 7 is a state transition diagram of process flow executing the program of the program analyzer.

FIG. 7 shows a state transition diagram in the case of the main process flowchart of FIG. 5. In the drawing, an inside of each circle represents a state of the transition.

An initial state is shown by "start". The control proceeds immediately to the next state, i,e., the start position saving process without read of the token information. The head token is obtained in this saving process, and the position information is saved to the start position saving area 33. Further, the control proceeds to the state of the DD-detection process after the token position is returned by one. After above start, the DD-detection process proceeds to the sequential input process of the token.

When the result of the DD-detection process indicates a completion of TD, i.e., the detection of the token "typedef" the control proceeds to the state of type definition process in accordance with the arrow line TD. In this step, the type name which is defined by a programmer is extracted from the following token sequence, and this token sequence is added to the defined type-name table 34. When the type definition process is finished, the control returns to the state of the start position saving process. On the other hand, when the character/token ";" is detected in the DD-detection process, the control proceeds to the state of completion of the declaration. The control proceeds to the detection in which the token sequence before this step indicates the declaration, and returns to the state of the start position saving process.

When the result of the DD-detection process indicates a completion of DD, i.e., the detection of the direct declarator, the control proceeds to the state of the identifier process in accordance with the arrow line DD. In this step, the following token sequence is input, and when this token indicates the character/token ";" the step proceeds to the state of completion of the declaration. The control proceeds to the detection that the token sequence before this step indicates the declaration, and returns to the state of the start position saving process. Further, when the character/token "=" or "," is detected, the control proceeds to the state of "wait-C". Further, the control proceeds to the detection of the character/token ";" in the outside of the symmetric symbol, and the proceeds to the state of the completion of the declaration. The control proceeds to the detection in which the token sequence indicates the declaration, and returns to the state of the start position saving process.

Further, when the token following the direct declarator indicates the character/token "{", the control proceeds to the state of "wait-B". The control proceeds to the detection of the character/token "}" which corresponds to the character/token "{", and further proceeds to the completion of the function and the detection in which the token sequence indicates the function definition. After registration of the function name/function start position into the function definition table 35, the control returns to the state of the start position saving process. Further, when the token following the direct declarator is none of the characters/tokens ";", ",", "=" or "{", the control proceeds to the completion of DS (detection of "Declaration Specifier"/direct declarator). The control proceeds to the state of the wait-A.

When the consecutive pair for the characters/tokens ";" and "{" in the outside of the symmetric symbol is detected, the control proceeds to the state of the "wait-B". In this step, the character/token "}" which corresponds to the character/token "{" is detected, the control proceeds to the completion of the function, and further proceeds to the detection in which the token sequence is the function definition. After registration of the function name/function start position into the function definition table 35, the control returns to the state of the start position saving process.

Still further, when the result of the DD-detection process is an completion of EOF, i.e., the detection of the completion of the C-source program 20, the control proceeds to the end through the arrow line EOF. The control proceeds to the process which outputs data which is developed in the function definition table 35 into output area 21 of the function definition of the external storage device.

Figure 8:
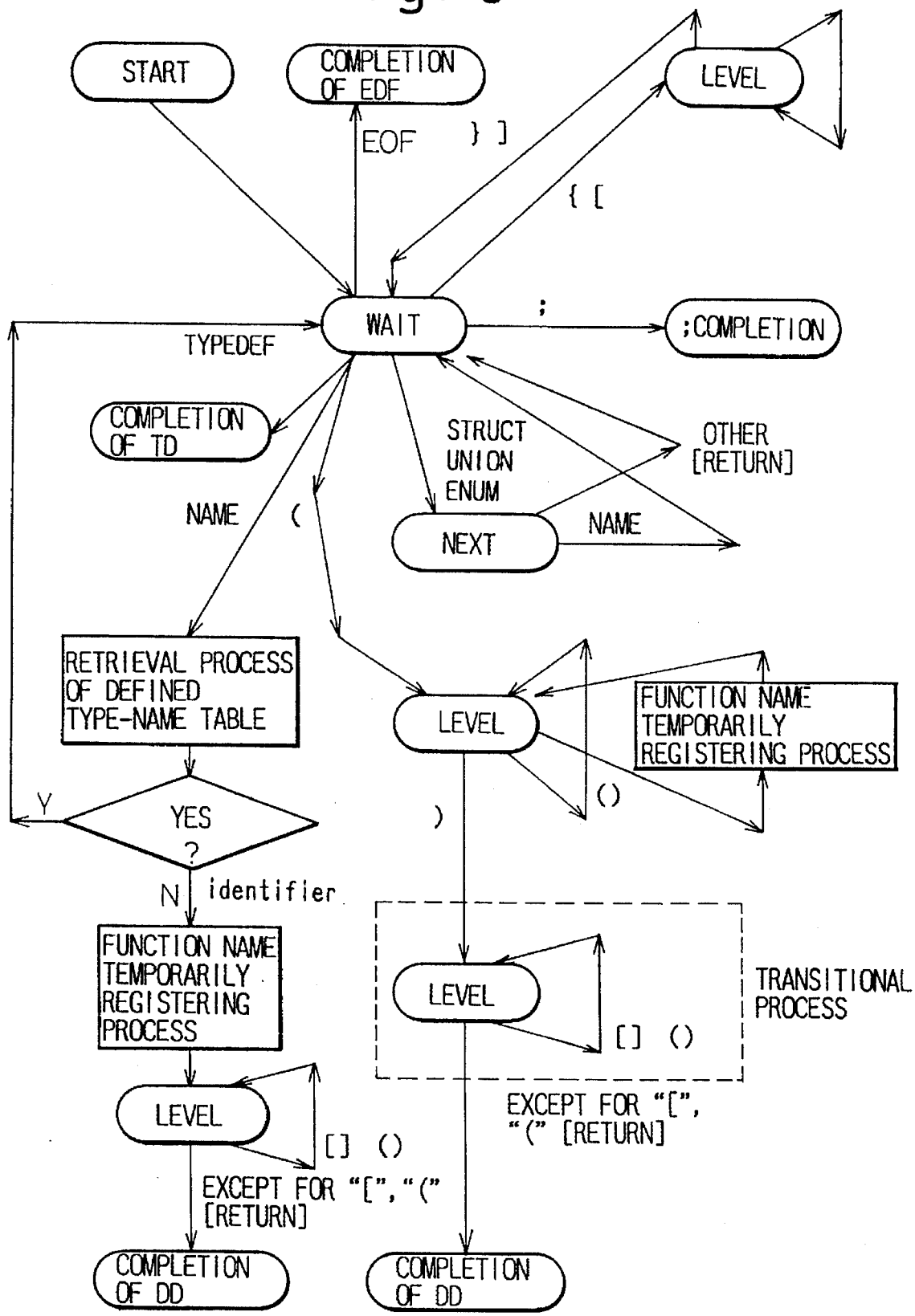
FIG. 8 is a state transition diagram of detailed process of the DD-detection.

FIG. 8 shows a detailed state transition of the DD-detection process of FIG. 7. The initial state is shown by "start". The step proceeds immediately to next state, i.e., "wait" state. In this step, the control proceeds to the read of the token. Any one of the tokens which is marked with, the control proceeds to next state along with the corresponding the arrow line. When the token indicates other token except for the above, the control proceeds to the read of next token.

When the token "typedef" is detected in the DD-detection process, the part of input token sequence is sorted to the declaration in a grammar. Further, the type definition process is called in the preceding step since it is necessary for processing.

The token "identifier" is the character sequence consisting of alphabetic/numerical characters which start from an alphabetic character or an underline except for the keyword (this is called "name"). The above character sequence includes the defined type-name. This defined type-name indicates the name which can be used as well as, for example, an integer type "int" which is defined by the programmer, and it is defined in the declaration including the token "typedef".

In the program, the name which is previously defined as the type-name is interpreted as the general type-name. The name except for the above, is interpreted as the identifier. In the present invention, the defined type-name is not handled as the identifier, and it is determined in accordance with whether the name is registered into the defined type-name table 34. That is, the defined type-name table 34 is retrieved for every detection of the name. It determines the type-name when it exists, and it determines the identifier when it does not exist.

The "level" represents a level process. This means that, when the character/token "(", "[" or "{" is detected, an internal counter is incremented by 1, and when the character/token ")", "]" or "}" is detected, an internal counter is incremented by +1, the internal counter is decremented by 1. As a result, when the counter value becomes 0, the counter recovers. That is, the inside of the symmetric symbol has the level higher than the outside by 1. This is utilized when skipping the range surrounded by the symmetric characters/tokens, for example, "(" and ")".

Another method of the level process is a method which counts one of left symmetric symbols "(", "[" or "{" which became a cause of transfer and one of corresponding right symmetric symbols ")", "]" or "}". For example, when the level is transferred by the left symmetric symbol "{", after this process, the counter is incremented by +1 based on the left symmetric symbol "{". When the level is transferred by the right symmetric symbol "}", after this process, the counter is decremented by 1 based on the right symmetric symbol "}". The level is not changed in the case of other symmetric symbols except for above. The same explanation as above are given to the character/token "(", and "[".

The "return" means the process which returns the input token position by one step. After this process, the token which is read in the last step is supplied again by the scanner program 30 on the next read operation.

As shown in FIG. 8, when detecting "identifier" the following characters/tokens "(..)" and "[..]" are skipped in accordance with the level process. This means that the characters/tokens are skipped until the last of the declaration and the direct declarator. Further, when detecting the character/token "(" in the "wait" state, the characters/tokens are skipped until the character/token ")" occurs in the transitional process. Further, the following characters/tokens "(..)" and "[..]" are skipped.

In this case, when the identifier is found in the initial level process, since the identifier has possibility of the function name, the identifier name is added to the function definition table 35 in accordance with the function name temporarily registering process. When it is found in the following step that the function name indicates the declaration, the registration is cancelled.

Figure 9:
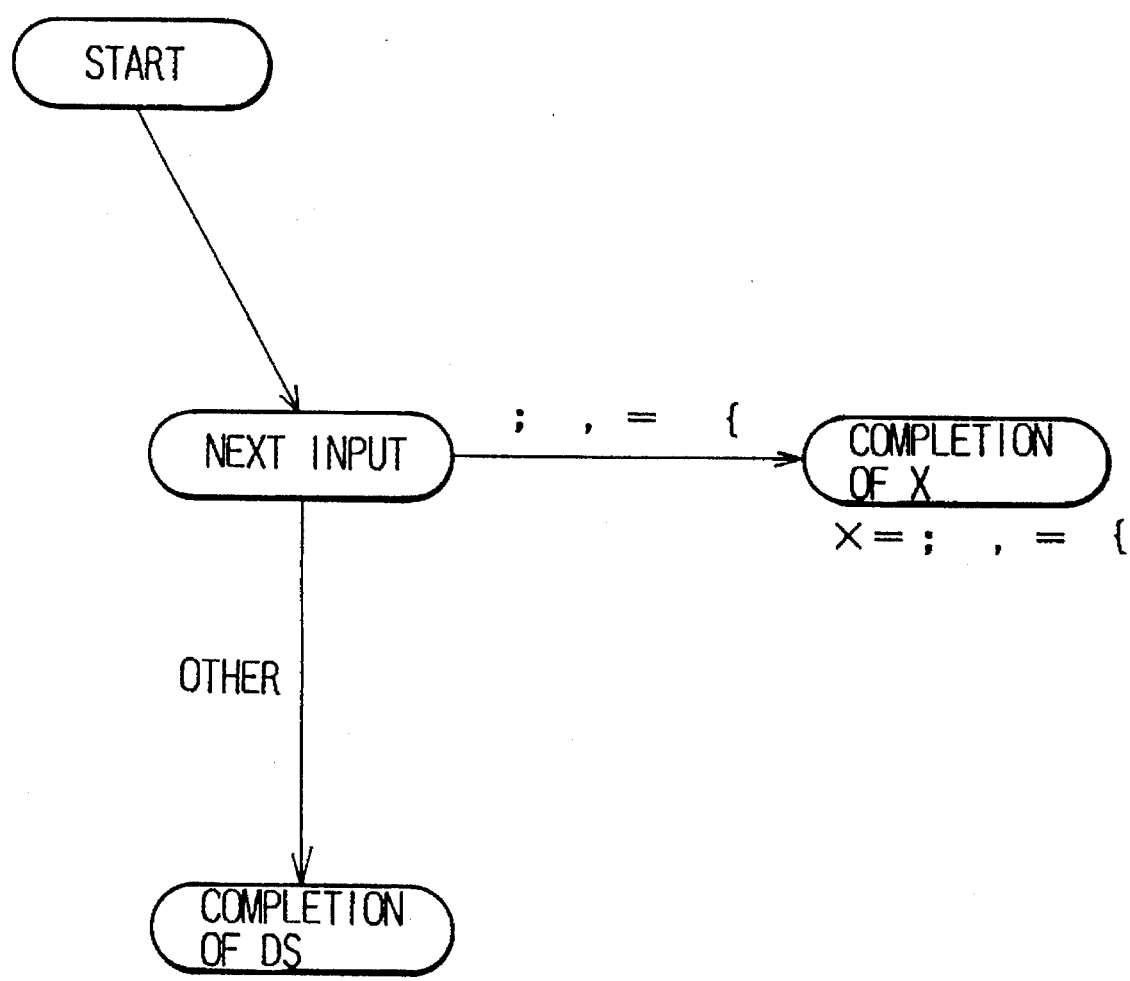
FIG. 9 is a state transition diagram of detailed process of the identification.

FIG. 9 is a view of a state transition in the identification process shown in FIG. 7. As shown in the drawing, when the characters/tokens which are read in the next of the declaration detected in the DD-detection process indicate any one of ";", ",", "=" and "{", one of these is returned as the "cause of completion". When the characters/tokens except for above are found, the "completion of DS" is returned.

Figure 10A:
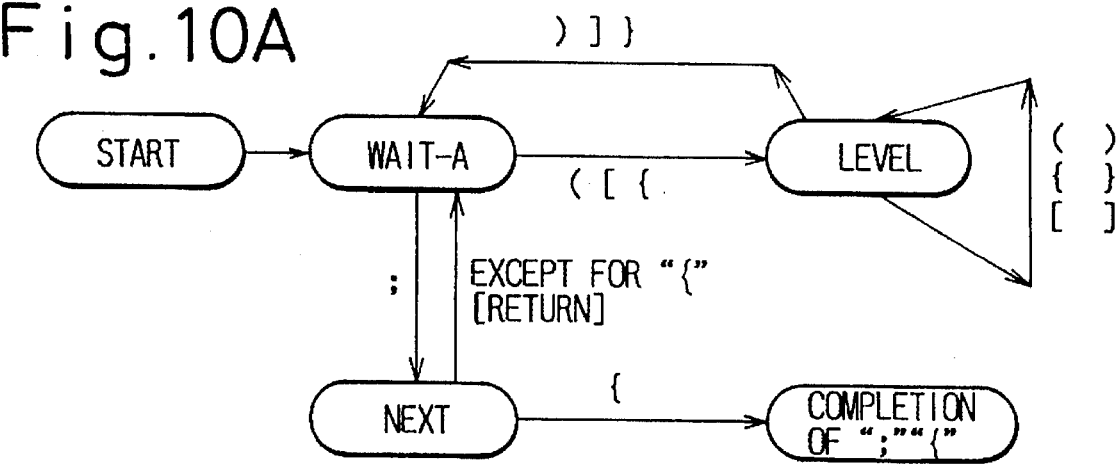
FIGS. 10A to 10C are state transition diagrams of detailed wait process.
Figure 10B:
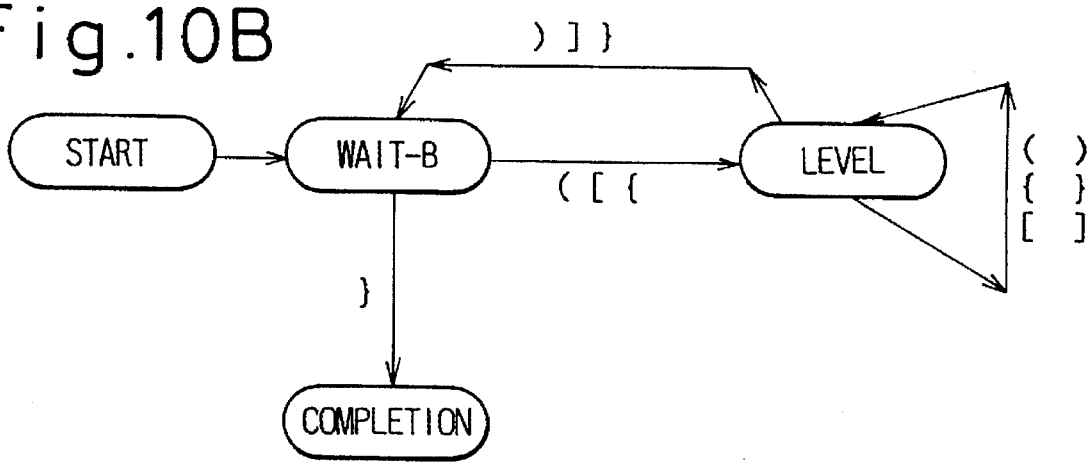

As shown in FIG. 10A, in the step of the "wait-A", when the detecting the token sequence ";" and "{" in the outside of the characters/tokens "( )", "[]" and "{ }", the process is completed. Further, as shown in FIG. 10B, in the step of the "wait-B", when the detecting the token "}" in the outside of the characters/tokens "( )", "[]" and "{ }", the process is completed. This step is performed for detecting the token "}" which becomes a pair of the token "{". Still further, in the step of the "wait-C" when the detecting the token ";" in the outside of the characters/tokens "( )", "[]" and "{ }", the process is completed.

FIG. 11 shows relationship between the token sequence which is detected in each state of FIG. 7 and declaration/function definition.

Figure 12:
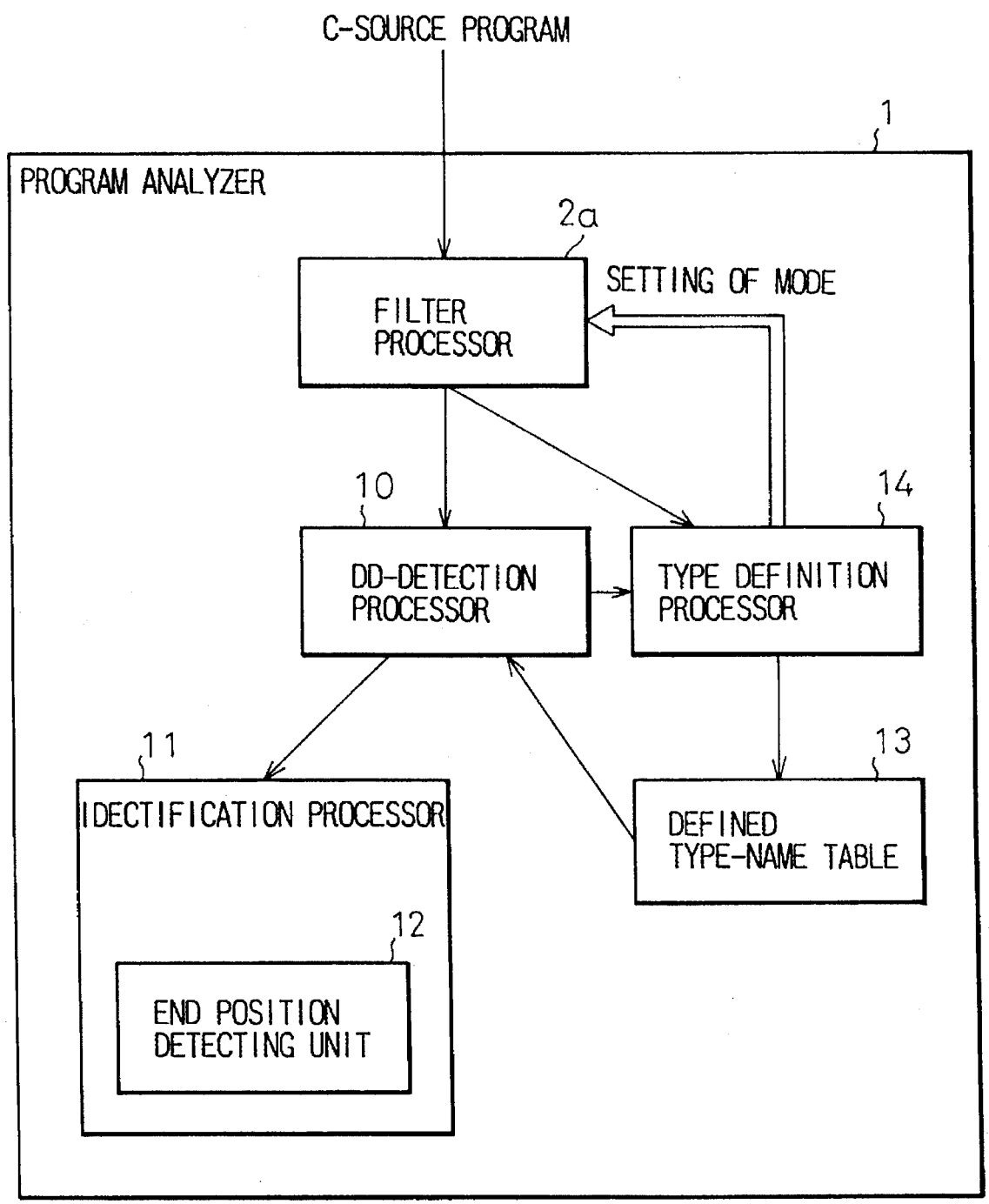
FIG. 12 shows another embodiment of the present invention.

FIG. 12 shows another embodiment of the present invention. In the drawing, reference number 1 denotes a program analyzer according to the present invention. This embodiment has a structure in which the C-source program is not splitted into tokens and sequentially input in every unit of characters. Further, the program analyzer 1 determines whether a part of the C-input source program is the declaration or the function definition. Reference number 2a denotes a filter processor which suppresses the output of the inner symmetric symbol from the input character sequence, outputs names recognized as a sequence of characters, suppresses the output by recognizing the numerical constant, and outputs all special characters one by one. The DD-detection processor 10, the identification processor 11, defined type-name table 13 and the type definition processor 14 have the same structure as that of FIG. 1.

A mode designation in FIG. 12 is used for changing the mode of the filter processor 2a. When the DD-detection processor 10 detects the name "typedef", a mode is designated by the type definition processor 14 which is started just after the detection of "typedef". After the designation, all the characters of the C-source program are transferred to the type definition processor 14. The type definition processor 14 performs an analysis process of the normal C-compiler, analyzes the declaration following the token "typedef", and registers the defined type-name. After this process, the mode of the filter processor 2a is returned to the normal mode.

FIG. 13 shows a detailed structure of the embodiment of FIG. 12 which is realized on a digital computer. In the drawing, reference number 30a denotes a filter program which executes the process of the filter processor 2a of FIG. 12. The output of the filter processor 2a is transferred to the program analyzer 31 for every name and special character in the form of the character information. The processes below the program 31 are the same as shown in FIG. 2. The filter has a normal mode and a transparent mode. In the transparent mode, the special characters belonging to the symmetric symbol, for example, the character/token "{" is also output.

FIG. 14 shows an input/output information of the filter program. The C-source program which becomes the object of the analysis is input as the character information. The character information is classified to the symmetric symbol, the name, the numerical constant, the white space character, and the special character. The filter program 30a outputs the symmetric symbol, the name and the special character. In this case, the "name" means the identifier and the defined-type-name. The "special character" means an operators such as "+", "−" or ".".

Next, the function of the filter program 30a is explained in detail. The filter program 30a sequentially outputs the C-source program from the head, and also outputs the special character and the name. The functions are as follows.

*Suppress the output of the inside of a pair of symmetric symbol "[]", "{ }", "".."", and "'..'".

*Collect a range of characters of under lines or alphabetic/numerical characters which start with an under line or an alphabetic character, and output this portion as a name.

*Collect a range of symbols "+" and "−" and the alphabetic/numerical character which starts with the numeral, and output this portion as the numerical constant.

*Suppress the output of a white space character (space, tab, new line, i.e. character for changing a line).

*Output the special characters (all printing characters except for alphabetic/numerical character, under line, symmetric symbol). In the transparent mode, the inside of the symmetric symbol is also output. In this case, although the symbol "( )", indicates a pair of the symmetric symbol in the grammatical rule, this symbol is excluded from the object of the suppression since the DD-detection processor 10 necessitates the contents inside of the symmetric symbol.

FIGS. 15A and 15B show the type of output information of the filter program 30a. As shown in FIG. 15A, the kind is "0" in the case of the name. The line number of the head character and the character sequence of the name follow the kind "0". As shown in FIG. 15B, the kind is "1" in the case of the special character. The line number of the character and the character code follow the kind "1".

The following explanation will be given for the justifiability of the process of the program analyzer according to the present invention.

The following explanation handles the C-source program which is correct grammatically. In general, the C-source program is stored as the character sequence including a character for changing a line (below, a new line character). The scanner picks up a unit of one or several characters, which is called "token", from the head of the program, and the token sequence is sequentially input to the program analyzer. According to the embodiment of the present invention, it is possible to provide a method which directly inputs the C-source program as the character sequence without passing the scanner.

The explanation is given as to the process in which the program analyzer shown in FIG. 7 classifies the token sequence into the function definition and the declaration and detects the position of their completion.

When this process is repeated, it is possible to extract all function-definitions and declarations which form the C-source program.

As a kind of the token, there are special symbols, for example, symbols "(", ",", ")"; keywords, for example, "if", "else" and "for"; a variable name, a function name, a numerical constant, and a character constant defined by the programmer. When the character which is called "space", i.e. white space character, exists between the tokens, the space is cancelled by the scanner. The character constant "'..'" and the character sequence """..""" are output by the scanner as one token. Accordingly, in the embodiment of the present invention, quotation marks """" and "''" are not found as the token.

However, in a method which does not use the scanner, it is necessary to handle these quotation marks as the symmetric symbol.

The general theory of a programming language will be explained below. In the following explanation, the language is a contex-free language which is not ambiguous. The C-language is satisfied this conditions. The definition of the production rule, the contex-free grammar, the terminal symbol, the non-terminal symbol, the start symbol, and the parse tree are omitted. These terms are disclosed in the following document. Alfred v. Aho & Jeffrey D. Ullman, "Principles of Compiler Design", 1977. Addison-Wesley Publishing Company. Inc., Reading Mass.

The production rule of the C-language is disclosed in the following document. Brian W. Kernighan & Dennis M. Ritche. "The Programming Language Second Edition", 1988, 1978 copyright AT&T Bell Laboratories Murray Hill, N.J., published by the Prentice-Hall International, Inc.

The scanner classifies the character constant "'.'" as the token "constant", and also classifies the character sequence ""..."" as the token "string". The program analyzer recognizes these character constant and character sequence as the token "constant" and "string", but the contents of these tokens are not used in the program analyzer.

Below, the token has the same meaning as the terminal symbol.

Definition

The terminal and the non-terminal symbols are called the symbol. The sequence consisting of the symbols is called a sentential form.

Definition

A:$\gamma$ is defined as a production rule, and $\alpha$ and $\beta$ are defined as an optional sentential form. The production rule (or grammatical rule) above is applied to the sentential form $\alpha A\beta$. Then, $\alpha A\beta \rightarrow \alpha\gamma\beta$. The production rule is repeatedly applied. When $\alpha_1 \rightarrow \alpha_2 \rightarrow \ldots \rightarrow \alpha_n\alpha_n$ is derived from $\alpha_1$, in the above, $\alpha_1 \rightarrow \alpha_2 \rightarrow \ldots \rightarrow \alpha_n$ is called a derivation step. Each step $\alpha_i \rightarrow \alpha_{i+1}$ is called a derivation series.

Note: in the production rule, the left of the symbol ":" is called the left-hand, and the right of the symbol ":" is called the right-hand.

In the case of the contex-free language, the left-hand is the non-terminal symbol, and the right-hand is a sentential form.

A plurality of rules having the same left side may exist.

The symbol "$\rightarrow$" may be used instead of the symbol ":" hereinafter.

One rule is applied to one derivation step.

For example

When A:a b c indicates one of the production rule, p A q r $\rightarrow$ p a b c q r. Where, a,b,c,p,q,r are symbols.

The keyword is the name which is previously defined in the programming language and has proper meaning. For example, "if", "struct" and "union" indicate the keyword of the C-language. In the following explanation, all keywords are shown by the large character "IF", "STRUCT" and "UNION" based on the fact that the spelling is fixed. On the other hand, the words in which the programmer can freely define are shown by the small character. Further, the identifier, the constant, etc., are shown by the small character based on the fact that the programmer can define the contents freely. All keywords are used as the terminal symbol in this embodiment.

Definition

In the C-language, the start symbol is shown by "translation unit". The C-program which is correct grammatically indicates one sentence.

Definition

The set which consists of a pair of terminal symbols "$x_i$, $Y_i$" (i=1,,,n), which is not superimposed when all terminal symbols "$X_i$, $Y_i$" are collected, and which satisfies next "conditions of a pair of symmetric symbols", is called a pair of symmetric symbol. Further, "$x_i$" is called left symmetric symbol, and "$Y_i$" is called right symmetric symbol. Further, these are called "symmetric symbol".

"Conditions of a pair of symmetric symbol"

The terminal symbols "$x_i$", "$y_i$" (i=1,,,n) are found simultaneously in the right side of the rule, and the rule has the following forms.

B: $\alpha x_i \beta y_i \gamma$

Where, $\beta$ is the non-terminal symbol; and $\alpha$, $\beta$ and $\gamma$ are sentential forms which do not include terminal symbols "$x_j$", "$Y_j$" (j=1,,,n).

The rule having above type is called B-type. The rule which does not include the symmetric symbol in the right side is called A-type.

A:$\alpha$(A-type)

In the C-language, "{", "}", "(", ")", "[" and A"]" are the symmetric symbols.

Definition

Two symmetric symbols $x_i$ and $y_i$ correspond to the sentence $\alpha$. When is derived from the start symbol, and these symbols $x_i$ and $y_i$ are produced on the same derivation step. That is, this means that the symmetric symbols $x_i$ and $y_i$ exist in the right-hand of the rule which is applied thereto.

Accordingly, one is the left symmetric symbol, and the other is the right symmetric symbol.

When the symmetric symbols $x_i$ and $y_i$ are shown together, the $x_i$ is the left symmetric symbol, and the $y_i$ is the right symmetric symbol.

Proposition 1

In the terminal-symbol sequence which is derived from the optional non-terminal symbol, the symmetric symbol which is found first (in the leftmost) is the left symmetric symbol.

Proof

When considering the derivation series from the non-terminal symbol to the terminal symbol sequence, based on the assumption regarding the symmetric symbol, the symmetric symbols $x_i$ and $Y_i$ are found in the left-hand when these are found newly in each derivation step. On the other hand, as is obvious from the definition of the derivation, all derivation steps do not erase previous terminal symbols, and hold the sequence of the terminal symbol. Accordingly, the relationship of once derived symmetric symbols $x_i$ and $y_i$ are not changed in the before and after sequence. Accordingly, the first terminal symbol on the sequence is any one of the $x_i$, i.e., the left symmetric symbol. QED Proposition 2

In the terminal-symbol sequence which is derived from the optional non-terminal symbol, when tracing each branch of the parse tree toward the root from the symmetric symbol $x_i$ and corresponding symmetric symbol $y_i$, these branches are joined in a node. The symbols $x_i$ and $y_i$, are childs of the node.

Proof

When a parent node of one token $x_i$ is given by N, the token $x_i$ is produced in accordance with the rule which is applied in the N. Based on the definition of the correspondence, the other token $y_i$ is also produced based on the same rule. Accordingly, these tokens are childs of the N. Therefore, when tracing the branch upward from the tokens $x_i$ and $Y_i$, these branches are joined in the N so that the tokens $x_i$ and $y_i$ are childs of the N. QED Corollary In the terminal-symbol sequence which is derived from the optional non-terminal symbol, the corresponding $x_i$ and $y_i$ are not descendant of different non-terminal symbol. For example, when a$\rightarrow$..b..c..$\rightarrow$..$x_i$..$y_i$.. , the symbols $x_i$ and $y_i$ are corresponded, and these symbols are not the descendent of the non-terminal symbol b and c.

Definition of Counter Process input: terminal-symbol sequence and one token position in that sequence.

process: first, the inner counter is set to "0". From the given token position (start token position), the tokens are sequentially traced toward right direction including the given token position. When the left symmetric symbol is found, the counter is incremented by =1. When the right symmetric symbol is found, the counter is decremented by 1. These steps are repeated until the last of the input sequence. Particularly, when the started token position is not shown, the steps are started from the head of the input.

Proposition 3

For the terminal-symbol sequence $\omega$ which is derived from the sentential form $\alpha$ which does not include the symmetric symbol, when starting the counter process from the optional left symmetric symbol $x_i$ in the terminal-symbol sequence $\omega$, the symmetric symbol corresponding to the $x_i$ is the symbol in which first, the counter value is returned to "0" first.

Proof

The proof is performed under three steps.

[1] For the terminal-symbol sequence $\omega$ which is derived from the sentential form $\alpha$ which does not include the symmetric symbol, when performing counter process from the head of $\omega$, the counter value is "0" in the last position of $\omega$:

As is obvious from the definition of the counter process, the counter value at the last of $\omega$ is equal to the value subtracting the count of the right symmetric symbol from the count of the left symmetric symbol of $\omega$.

The rule which is applied in each step of derivation from to is either the A-type or the B-type. When it is the A-type, the count of the left/right symmetric symbol are not changed in before and behind steps. When it is the B-type, the count of the left/right symmetric symbol are increased by one. Accordingly, the difference between the number of the left/right symmetric symbols are not changed in each step of derivation. First, the count of both the left/right symmetric symbol contained in $\alpha$ is equal to both "0". That is, the count of left is equal to that of the right. Accordingly, for $\omega$, the count of the left/right symmetric symbol is equal. Accordingly, when the counter process is performed to $\omega$, the result becomes "0". QED

[2] On the way of the counter process of $\omega$, the counter value is always positive or 0:

This is proved by an induction regarding the count of the derivation steps "n" from $\alpha$ to $\omega$.

When n=0, $\alpha$ is equal to $\omega$, $\alpha$ becomes terminal-symbol sequence, the symmetric symbol is not contained in $\omega$ based on an assumption on $\alpha$, accordingly, the counter value is always 0 until the last step.

When n>=0, assuming that the counter value is always positive or 0, the same result is obtained when n+1.

The rule of the B-type which is applied first in the derivation from $\alpha$ to $\omega$ is as follows.

B: p $x_i$ q $y_i$ r

Where, p, q and r are sentential forms which do not include the symmetric symbol. Since the count of the derivation steps from the head of non-terminal symbols p, q and r to the corresponding portions in $\omega$ are below n, the last value of the counter process to the p, q and r is "0" based on the case [1] and the induction, and the value on the way is positive or 0.

When performing the counter process to $\alpha$ which is derived from the p $x_i$ q $y_i$ r, the result is positive or 0 for the "p" and is "1" for the $x_i$. For the "q", the result becomes "1" in the last of er passing through the value which always adds the count value, which is obtained by simply inputting $\omega$ derived from q to "1". Further, the result is "1" or "0" for the $y_i$, and always passes through positive value or "0" for "r". As a result, the counter value always becomes positive or 0 for $\omega$.

[3] Proof of Proposition 3

On the step of the derivation from $\alpha$ to $\omega$, the rule which is applied in the derivation step which produce the $x_i$ is given by the following form.

B: p $x_i$ q $y_i$ r

Where, p, q and r are sentential forms which do not include the symmetric symbol. When starting the counter process from the $x_i$, the counter value becomes "1" for the $x_i$, and passes through the value which always adds the counter value at the input of "q" to the value "1". For the value "q", the counter value becomes over "1" from the items [1] and [2], and becomes "1" in the last. Accordingly, for the $x_i q y_i$ the first the counter value returns to the value "0" in the $y_i$. The $y_i$ indicates the symmetric symbol corresponding to the $x_i$. QED From above explanation of the counter process, it is obvious that the symmetric symbol $y_i$ corresponding to the left symmetric symbol $x_i$ which is designated on the sentence of $\omega$. In the following explanation, the description $X_i.. y_i$ is the range from the $x_i$ to the corresponding $y_i$ including both ends on the terminal-symbol sequence.

Note: When it is obvious that the description $x_i .. y_i$ means the terminal-symbol sequence from the context, the non-terminal symbol or the sentential form may be the terminal-symbol sequence which is derived in the following process. Further, the non-terminal symbol of the sentential form may be the portions which is derived from the non-terminal symbol in the terminal-symbol sequence which is derived from the sentential form.

The description "declaration" means the terminal-symbol sequence which is derived from the "declaration".

Proposition 4

The C-program is formed of sequence consisting of the "function-definition" and the "declaration".

Proof

One C-program is sentense which is derived from the start symbol "translation-unit".

The rule which has the "translation-unit" as the left-hand are as follows.

translation-unit:
    external-declaration
    translation-unit external-declaration Therefore, the C-source program is the sequence consisting of "external-declaration". Further, the rule in which the "external-declaration" is defined in the left-hand is as follows.

external-declaration:
    function-definition (1)
    declaration

Therefore, the C-source program is a sequence consisting of "function-definition" and "declaration". QED Note: The rule (1) is a set of two rules each having the same left side. That is, the rule (1) is the same as the following two rules.

external-declaration: function-definition
external-declaration: declaration

The embodiment of the program analyzer according to the present invention is explained below. That is, the process starts from each state shown in FIG. 7, and FIG. 7 shows the state of transition when inputting the right side of each rule. The portions which proves the above is shown by the proposition "nn". After this proof, the propositions are sequentially explained.

```
function.definition:
    declaration.specifiers_opt declarator compound.statement
    DD-detection process—>DD-identification—>{-wait-B—>}
        process proposition 19
    declaration.specifiers_opt declarator declaration.list
    compound.statement
    DD-detection process—>DD-identification—>DS-wait-A—>;
        process {-wait-B—>}
            proposition 19
declaration.list:
    declaration
    declaration.list declaration
    wait-A—>proposition 5
    identification—>DS—>wait-A—>(;)"next" proposition 18
    process
declaration: declaration.specifiers;
    DD-detection process—>;proposition 15
    identification—>DS-wait-A—>(;)"next" proposition 16
    process
    wait-A—>(;)*next" proposition 17
    declaration.specifiers init.declarator.list;
    DD-detection process—>DD-identification—>;proposition 15
        process
    DD-detection process—>DD-identification—>= -wait-C—>;
        process proposition 15
    DD-detection process—>DD-identification—>, -wait-C—>;
        process proposition 15
    identification—>DS-wait-A—>(;)"next" proposition 16
        process
    wait-A—>(;)"next" proposition 17
declaration.specifiers:
    DD-detection process—>proposition 13
    DD-detection process—>TD proposition 13
    identification—>DS-wait-A—>proposition 14
    process
    wait-A—>proposition 15
init.declarator.list:
    init.declarator
    DD-detection process—>DD proposition 11
    DD-detection process-DD-identification—>= -wait-C—>
        process proposition 11
    wait-A—>proposition 5
    wait-C—>proposition 6
init.declarator.list.init.declarator
    DD-detection process-DD-identification—>, -wait-C—>
        process proposition 12
    DD-detection process-DD-identification—>= -wait-C—>
        process proposition 12
    wait-A—>proposition 5
init.declarator:
    declarator
    DD-detection process—>DD proposition 9
    wait-A—>proposition 5
    wait-C—>proposition 6
    declarator = initializer
    DD-detection process—>DD-identification—>= -wait-C—>
        process proposition 10
    wait-A—>proposition 5
    wait-C—>proposition 6
declarator: pointer_opt direct.declarator
    DD-detection process—>DD proposition 9
    wait-A—>proposition 5
    wait-C—>proposition 6
pointer:
    DD-detection process—>proposition 7
    wait-A—>proposition 5
    wait-C—>proposition 6
direct.declarator:
    DD-detection process—>DD proposition 8
    wait-A—>proposition 5
    wait-C—>proposition 6
```

Note: Some case omits the left side of the rule in the above step. In this case, the right side is input. The symbol "(..)" indicates the stop of the detection process at the on-way state in which the detection does not complete just after the symbol ";" is read. The symbol "next" indicates the next state in the identification process.
The "DD-detection process" and "identification process" denote the state in FIG. 7.

The DD indicates "direct.declarator", and the DS indicates "declaration.specifier".
The symbol "*_opt" indicates possibility of the case either the item exists or does not exist. That is, this symbol "*_opt" indicates sets of two rules where the item exists in one and does not exist in another.
The symbol "a—>DD" and "a—>DS" indicate the detection of DD and DS in the state "a".
The symbol "wait-A—>(;)"next"" indicates the stop of the wait-A process on the "next" state after the last symbol ";" of the input sequence is read.
When the last step is finished by "—>", this symbol indicates that the process reaches to the end of the input token sequence without detection of the token which is objected in the detection process.
The order of the proposition is basically determined as the head (leaf) of the parse tree is the first.
In the above, the meaning of "skips ω" indicates that the process inputs token sequence ω until the last portion of ω without completion of process, in which the last state is the same as the initial state, and in which the next input position becomes next of ω.

Assumption 1

TYPEDEF is not included in the "declaration-specifiers" at the right-hand of the "function-definition".

This is defined in this explanation although it is not described in the document "Kernighan and Ritchie" mentioned above. The compiler which is used in actuality employs this definition. This is permitted based on the type-definition.

Proposition 5

The "wait-A" skips token sequences below.

```
(1) declaration.specifiers
(2) init.declarator.list
    init.declarator
    declarator
    initializer
    pointer
    direct.declarator
    operation: wait-A—>
    Proof
```

Figure 10C:
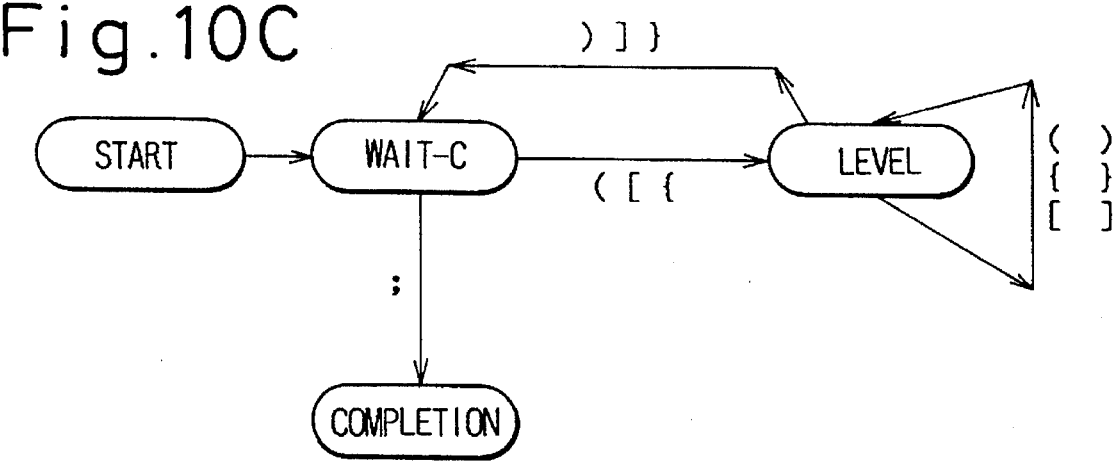

As is obvious from the state-transition diagram in FIG. 10, in the outside of pair of the symmetric symbols "(..)", "[..]" and "{..}", the wait-A completes only detection of the consecutive pair of the tokens ";" and "{". When detecting any one of symmetric symbols "(", "[" and "{", the process skips tokens until the corresponding symmetric symbols ")", "]" and "}" based on the counter process. The skip operation is performed in the range of the terminal-symbol sequence which is derived from one non-terminal symbol in accordance with the Proposition 2. Accordingly, the skip operation is not performed over the right end from the input token sequence. Another token is skipped one by one. Therefore, it is proved that the sequence of the symbols ";" and "{" are not included which are derived from each non-terminal symbol.

(1) The rule which has declaration-specifiers" in the left-hand is as follows.

declaration-specifiers:

storage-class-specifier declaration-specifiers_opt type-specifier declaration-specifiers_opt type-qualifier declaration-specifiers_opt Accordingly, sets of the terminal symbols which form "declaration-specifiers" is the sum of sets of the terminal symbols which forms "storage-class-specifier, type-specifiers, and type-qualifier". Accordingly, it is obvious that these are shown as follows based on terminal symbols of the C-language.

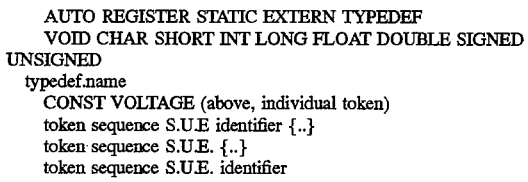

The symbol ";" is not found in the above example except for the inner portion of the symmetric symbol. Therefore, the symbol "declaration-specifiers" is skipped by the "wait-A".

Note: S.U.E. should be read by replacing any one of "struct", "union" and "enum".

(2) As is obvious from the previous rule, or the document of Kernighan and Ritchie, the symbol "init-declarator" is included in the right side of the rule in which init-declarator-list" becomes the left side. The symbols "declarator" and "initializer" are included in the right side of the rule in which these become the left side. The symbols "pointer" and "direct-declarator" are included in the right side of the rule in which "declarator" becomes the left side.

Therefore, it is possible to form "init-declarator", "declarator", "initializer", "pointer", and "direct-declarator" from the terminal symbol which forms "init-declarator". Accordingly, if it is shown that the optional sequence consisting of the terminal symbol which forms "init-declarator-list" is sequentially skipped, it is possible to prove that each non-terminal symbol is skipped The terminal symbol which is derived from the init-declarator-list" is formed by the following token except for the inner portion of the symmetric symbol. Since this can be obtained by routine, the details are omitted. The steps are described briefly as follows. First, it is assumed that the set A of the terminal symbol is empty, and the set B of the non-terminal symbol is the set consisting of only one "init-declarator-list". One source of the set B is picked up, and all rules in which the taken set B becomes the left-hand are collected, the terminal symbols and the non-terminal symbols which are included in the right-hand are added to the sets A and B. In this case, the symbols between the symmetric symbols are added. Once used rule is not used again. This process has a finite step and is finished at that step, and the set A of the terminal symbol which is obtained at the last can be obtained from the process. The result becomes as follows.

```
the terminal symbol which forms
"init.declarator.list":
*= /= %= += -= <<= >>=
* CONST VOLATILE identifier ( ) [ ] =, &= ¯= |=
constant string. —> ++ & + − ¬ ! SIZEOF /
% << >> < > <= >= = = != ¯ | && || ? : { }
```

The symbol ";" is not included. Accordingly, each symbols of the above item (2) is skipped in the "wait-A". QED
Proposition 6

The "wait-C" skips the following token sequence.

```
init.declarator         ↑
declarator
initializer             B
pointer
direct. declarator      ↓
operation: wait-C—>
Proof
```

The wait-C completes only when the symbol ";" is detected in the outside of pair symmetric symbols "(..)", "[..]" and "{..}" as shown in FIG. 10. The skip operation is the same as the wait-A.

As is obvious from the Proposition 5, the symbol is not found in the outside of the symmetric symbol in the terminal-symbol sequence which is derived from "init-declarator" and each symbol of the set B. Therefore, the wait-C skips each of sets B. QED
Proposition 7

```
input: pointer
operation: DD-detection process — —>
Proof
```

The DD-detection process detects the symbol ";", the identifier which is not positioned just after "STRUCT, UNION, ENUM", the symbol "(", or "TYPEDEF" except for pair of the symmetric symbols "{}" and "[]".

It is obvious that the terminal symbols forming the terminal-symbol sequence which are derived from the pointer is the following token based on the same method as shown by the Proposition 5.

* CONST VOLATIVE

Accordingly, the pointer is the sequence consisting of "*, CONST, VOLATILE". These symbols are sequentially skipped in the state of "wait" which is the initial state from the definition of the DD-detection process. Accordingly, the pointer is skipped, the last state becomes the state of "wait", and the next read position becomes the input sequence. QED
Proposition 8

In the DD-detection process, the sequence is read until the last portion when inputting the "direct-declarator", and is finished in the detection of the "DD-detection".

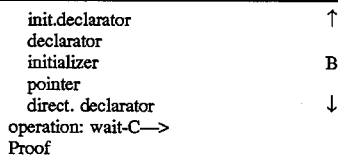

The rule which has the "direct-declarator" as the left-hand is as follows based on the document "Kernighan and Ritchie".

direct-declarator:
  identifier
  (declarator)
  direct-declarator [constant-expression$_{opt}$]
  direct-declarator (parameter-type-list)
  direct-declarator (identifier-list$_{opt}$)

Therefore, the terminal-symbol sequence which is derived from "direct-declarator" has the head of "identifier" or "(..)", and the following portion is the sequence consisting of "[..]" and "(..)".

From the definition of the DD-detection process, when inputting the symbol "(", the step proceeds to the level process and searches the corresponding symbol ")". Further, the step proceeds to the transitional process. Further, the step proceeds to the read of token "x", when the token "x" is either "(" or "[", the corresponding ")" or "]" is obtained based on the level process, and the next token is read. These steps are repeated. When the "x" is not "(" or "[", the token position is returned by one, and the process is finished as the DD-detection. When inputting "identifier" in the initial state, the token "x" is read and the same processes are performed. Accordingly, in the DD-detection, when the "direct-declarator" is input, the declarator is read until the last portion, and the process is finished in the DD-detection. QED Proposition 9

When the "declarator" is input in the DD-detection process, the declarator is read until the last portion, and completes in the "DD-detection".

```
input: declarator
operation: DD-detection processing —>DD
Proof
```

The rule which has the "declarator" as the left-hand is as follows.

declarator: pointer$_{opt}$ direct-declarator

The pointer is skipped in the DD-detection process, and the "direct-declaration" is read from the head portion based on the proposition 7. The declaration is read until the last portion in the DD-detection process based on the proposition 8, and the process is finished in the "DD-detection". QED Proposition 10

When next token is input in the DD-detection process, the DD is detected, and the identification process which is started detects the symbol "=". The sequentially started "wait-C" is skipped until the last portion.

```
input: declarator = initializer
operation: DD-detection—>DD-identification—>=-wait-C —>
    process process
Proof
```

Since the "declarator" is input first in the DD-detection process, the "declarator" is read until the last portion based on the proposition 9, and the process is finished in the "DD-detection". Further, since the symbol "=" is input in the identification process which is started, the process is finished when detecting the "=detection" based on the definition of the identification process shown in FIG. 9. Next, "wait-C" is started in accordance with the process of FIG. 7.

This indicates the input of the "initializer", this is skipped until the last of the "initializer" based on the proposition 6.

Proposition 11

When the "init-declarator" is input in the DD-detection process, any one of following cases is occurred.

① The DD-detection process reads the "declarator" until the last portion, the process is finished by the DD-detection.

② The DD-detection process is finished by the DD-detection, the successively started identification process detects the symbol "=", and the started "wait-C" is skipped until the last of "init-declarator".

```
input: init.declarator
operation: DD-detection—>DD                          ①
    DD-detection —>DD-identification—>=-wait-C—>    ②
    process process
Proof
```

The rule which has the "init-declarator" as the left-hand is as follows.

```
init.declarator:
    declarator                          (1)
    declarator = initializer            (2)
```

When (1), the case ① of this proposition occurs based on the proposition 9.

When (2), the case ② of this proposition occurs based on the proposition 10. QED Proposition 12

When the next input is input in the DD-detection process, any one of next ③ or ④ occurs.

input: init-declarator-list, init-declarator

③ The DD is detected in the DD-detection process and the process is finished, the symbol ";" is detected in the successively started identification process, and the following started "wait-C" is skipped until the last of the process.

④ The DD is detected in the DD-detection process and the process is finished, the symbol "=" is detected in the successively started identification process, and the successively started "wait-C" is skipped until the last of the process.

```
input: init.declarator.list, init.declarator
operation: DD-detection—>DD-identification—>, -wait-C—>   ③
    process process
    DD-detection—>DD -identification—>=-wait-C—>          ④
Proof
```

The rule which has the "init-declarator-list" as the left-hand is as follows.

```
init.declarator.list:
    init.declarator
    init.declarator.list, init.declarator
```

Accordingly, whether the "init-declarator-list" consists of one "init-declarator" or the sequence of the symbol ";" and "init-declarator". Accordingly, the input of this proposition is shown by the "init-declarator" and the sequence consisting of the symbol ";" and "init-declarator". Therefore, this coincides with the "init-declarator".

First, the "init-declarator" is input in the DD-detection process. The cases ① and ② occur based on the Proposition 11.

The following input sequence is shown by repetition of the symbol "," and the "init declarator".

In the case of the case ①, the identification process which is started in accordance with the process of FIG. 7 inputs above after DD-detection process. When inputting the symbol ",", the identification process is finished, the successively started "wait-C" inputs the "init-declarator" and the symbol ";". The "init-declarator" is skipped based on the proposition 6, and as shown in FIG. 10, the symbol "," is skipped based on the definition of the "wait-C". That is, the "wait-C" skips these steps. Accordingly, the case ③ occurs.

In the case of the case ②, the "wait-C" which is already started inputs the repetition of the symbol ";" and the "init-declarator". Similarly, the "wait-C" skips these steps. Accordingly, the case ④ occurs. QED Corollary When the "init-declarator-list" is input in the DD-detection process, the case ① or ② of the proposition 11, or the case ③ or ④ of the proposition 12 occurs.

Proposition 13

The "declaration-specifiers" which does not include the "TYPEDEF" is skipped in the DD-detection process.

Further, when the "declaration-specifiers" which includes the "TYPEDEF" is input, the process is finished by the DD-detection.

--- input: declaration.specifiers
operation: DD-detection process —>
   DD-detection process —>TD
Proof

---

The tokens except for following four are sequentially skipped based on the definition of the DD-detection process as shown in FIG. 8.

TYPEDEF identifier (;

Further, when the "identifier" follows "STRUCT", "UNION" or "ENUM" (below, these are shown by S.U.E), the "identifier" is skipped.

The terminal-symbol sequence which is derived from the "declaration-specifiers" has the following sequence form as shown by the proof of the proposition.

---

AUTO REGISTER STATIC EXTERN TYPEDEF
VOID CHAR SHORT INT LONG FLOAT DOUBLE SIGNED
UNSIGNED
  typedef.name
  CONST VOLATILE (above, individual token)
  the token sequence S.U.E identifier {..}         ↑
  the token sequence S.U.E {..}                     A
  the token sequence S.U.E identifier               ↓

---

In the DD-detection process, the initial state is shown by "wait". In the above tokens "AUTO"... "VOLATILE", the token except for the token "TYPEDEF" is read one by one in the state of "wait" based on the definition of the DD-detection process.

Further, the token sequences except for above are skipped one by one, and the process returns to the "wait". Further, next read position becomes just after the state of "wait". This reason as follows.

① When inputting the token sequence "S.U.E identifier {..}"

When inputting S.U.E in the "wait" state, the process proceeds to the "next" state of FIG. 8. When inputting the "identifier" in the "next" state, since this token belongs to the names, the process returns to the original "wait" state. When inputting the symbol "{", the process is skipped until corresponding "}" based on the level process, and returns to the "wait" state. This symbol "}" is simultaneously derived from the non-terminal symbol "declaration-specifiers" with the symbol "{" based on the proposition 2. Accordingly, the token "S.U.E identifier {..}" is skipped, and the process returns to the "wait" state. Next read position is the next of the symbol "}".

② When inputting the token "S.U.E {..}"

When inputting S.U.E in the "wait" state, the process proceeds to the "next" state. When inputting the symbol "{" in the "next" state, the position of the token is returned and the process returns to the "wait" state. In the "wait" state, since the same symbol "{" is read by next read operation, the process proceeds to the level process based on the definition. Accordingly, after the process is skipped until the corresponding "}", and returns the "wait" state. Accordingly, the "S.U.E {..}" is skipped, and the process returns to the "wait" state. Next read position is the next of the symbol "}". ③ When inputting the token "S.U.E identifier x" ("x" indicates the token except for the symbol "{")

When inputting S.U.E in the "wait" state, the process proceeds to the "next" state. When inputting the "identifier" in the "next" state, the process returns to the original "wait" state. When inputting the symbol "x", after the token is returned by one, the process returns the "wait" state. The next read token is the symbol "x".

It is proved that, from above cases ① to ③, above three token sequence are skipped in the wait state. Further, the read position just after above process is shown by the position following the token sequence.

From the above explanation, the "declaration-specifiers" which does not include "TYPEDEF" is skipped by the DD-detection process, and the process becomes "wait" state in the last state. Next read position becomes just after the above process.

When the "declaration-specifiers" which includes "TYPEDEF" is input, the above token or the token sequence A is sequentially read and the "TYPEDEF" is read. The process is finished by the TD detection. QED
proposition 14

When the "declaration-specifiers" is input in the identification process, the process is finished by the DS detection, the successively started "wait-A" is skipped until the last portion.

--- input: declaration.specifiers
operation: identification process —> DS -wait-A—>
Proof

---

As shown in the proof of the proposition 5, the "declaration-specifiers" is shown by the sequence of next token and the token sequence.

---

AUTO REGISTER STATIC EXTERN TYPEDEF
VOID CHAR SHORT INT LONG FLOAT DOUBLE SIGNED
UNSIGNED
  typedef.name
  CONST VOLATILE (above, individual token)
  the token sequence S.U.E identifier {..}         ↑
  the token sequence S.U.E {..}                     A
  the token sequence S.U.E identifier               ↓

---

When the head (STRUCT UNION ENUM) of the above each token or the sequence of the token A, as shown in FIG.

9, since these are not the tokens of ";", ",", "=" and "{", the process is finished by the DS detection. Although the remaining portions are input in next started "wait-A", since these are also the above each token or the sequence of the token A, the tokens becomes the "declaration-specifiers", and is skipped until the last portion based on the proposition 5. QED The above is the reason of the naming of "DS detection". That is, the token which forms the "declaration-specifiers" is defined as the object of the detection, and also defined as the DS detection when another token except for the above ";", ",", "=" and "{" is read.

Proposition 15

When the program analyzer inputs the "declaration", any one of next cases is recognized.

(a);
(b)DD;
(c)DD,;
(d)DD=;

Note: The sequence of the result of detection of each partial process in FIG. 7 is called the recognition of the program analyzer.

Proof

The rule which has the "declaration" as the left-hand is as follows.

| declaration: | |
|---|---|
| declaration.specifiers; | (1) |
| declaration.specifiers init.declarator.list; | (2) |

In the program analyzer, first, the DD-detection process is started in accordance with the process in FIG. 7. When the case (1) is input in the DD-detection process, the "declaration-specifiers" is skipped based on the proposition 13. The next token is the symbol ";", and this symbol is detected in the DD-detection process. Accordingly, the sequence of the above item (a) is recognized.

When inputting the case (2), the "declaration-specifiers" is skipped in the DD-detection process based on the proposition 13. The following input is shown by the "init-declarator-list;". Based on the system of the proposition 12, any one of next cases ①, ②, ③ and ④ occur when inputting the "init-declarator-list".

That is,

① The last process is read in the DD-detection process, and the process is finished by the DD detection.

② The DD-detection process is finished by the DD detection, the symbol "=" is detected in the following identification process and the process is finished. Further, the successively started "wait-C" is skipped until the last of the "init-declarator".

③ The DD-detection process is finished by the DD detection, the symbol "," is detected in the following identification process and the process is finished. Further, the successively started "wait-C" is skipped until the last portion.

④ The DD-detection process is finished by the DD detection, the symbol "=" is detected in the following identification process and the process is finished. Further, the successively started "wait-C" is skipped until the last portion.

In the case of the case ①, after DD detection, the symbol ";" is detected in the following started identification process and the process is finished.

Accordingly, the recognition becomes as follows.

DD ;

This corresponds to the case (a).

In the case of the case ②, the symbol ";" is detected in the "wait-C", the process is finished after this detection.

Accordingly, the recognition becomes as follows.

DD=;

This corresponds to the case (b).

In the case of the case ③, the same sort of process as above is done.

Accordingly, the recognition becomes as follows.

DD,;

This corresponds to the item (c).

In the case of the case ④, the same sort of process as above is done.

Accordingly, the recognition becomes as follows.

DD=;

This corresponds to the case (d). QED

Proposition 16

When the "declaration" is input in the identification process, the DS is detected. The successively started "wait-A" reads the input until the last portion, and the last state becomes the state of "next" in the "wait-A".

input: declaration operation: identification process→DS -wait-A→(;) "next"

Proof

The rule which has the "declaration" as the left-hand is as follows.

| declaration: | |
|---|---|
| declaration.specifiers; | ① |
| declaration.specifiers init.declarator.list; | ② |

In the case of the case ①, when the "declaration-specifiers" is input in a distinction process, the identification process is finished by the DS detection based on the proposition 14, the following started "wait-A" is skipped until the last portion of the process as shown by FIG. 7 based on the proposition 5. Further, the "wait-A" inputs the symbol ";" which is the last of the case ①, and reads this from the definition of the "wait-A" and becomes the "next" state of the "wait-A".

In the case of the case ②, when the "declaration-specifiers" is input in a distinction process, the identification process is finished by the DS detection based on the proposition 14, the successively started "wait-A" is skipped until the last portion. Further, although the "wait-A" inputs the symbol "init-declarator-list", the "wait-A" is skipped until the last portion of the process. Further, the "wait-A" inputs the symbol ";" which is the last of the item ②, and becomes the "next" state. QED.

Proposition 17

When the "wait-A" inputs the "declarator", the wait-A" reads until the last portion of the process, and becomes the "next" state of the "wait-A".

input: declaration
operation: wait-A —> (;) "next"
Proof

The rule which has the "declaration" as the left-hand is as follows.

```
declaration:
    declaration.specifiers;                              ①
    declaration.specifiers init.declarator.list;         ②
```

In the case of cases ① and ② the "wait-A" first, reads the "declaration-specifiers".

The "declaration-specifiers" is the sequence of the next terminal symbols and the terminal-symbol sequences as shown by the proposition 5.

```
AUTO REGISTER STATIC EXTERN TYPEDEF
VOID CHAR SHORT INT LONG FLOAT DOUBLE SIGNED
UNSIGNED
typedef.name
CONST VOLATILE (above, individual token)
the token sequence S.U.E identifier {..}          ↑
the token sequence S.U.E {..}                     A
the token sequence S.U.E identifier               ↓
```

The "wait-A" is finished only when the consecutive sequence of the tokens ";" and "{" is read. Further, the process becomes the "next" state only just after the token ";" is read. From the above, the "wait-A" reads the "declaration-specifiers" until the last portion. The last state is the same as the initial state.

In the case of the case ①, the "wait-A" next, reads the token ";". Accordingly, the process is finished in the "next" state.

In the case of the case ②, the "wait-A" next, reads the "init-declarator-list". The "wait-A" skips the "init-declarator-list" based on the proposition 5. Next, since the "wait-A" reads the token ";", the process is finished in the "next" state. QED Proposition 18

The program analyzer inputs the "declaration-list", any one of the next items occurs.

When the "declaration-list" is input in the identification process, the process is finished by the DS detection. The successively started "wait-A" reads until the last of the process, the process becomes the "next" state.

```
input: declaration.list
operation: identification process —> DS -wait-A —> (;)
"next"
Proof
```

The rule which has the "declaration-list" as the left-hand is as follow.

```
declaration.list:    declaration
                     declaration.list declaration
```

Accordingly, the "declaration-list" is the sequence of one or more "declaration".

First, when the "declaration" is input in the identification process, the process is finished by the DS detection based on the proposition 16. The successively started "wait-A" reads until the last and becomes the "next" state.

When the "declaration-list" is composed of only one "declaration", since the input is finished by this process, this proposition is concluded.

When the "declaration-list" is composed by a plurality of "declaration", the "wait-A" reads the following "declaration" based on the "next" state of the above process.

The symbol "{" is not positioned at the head of the "declaration". This is because the rule which has the "declaration" as the left-hand is as follows.

```
declaration:
    declaration.specifiers;                              ①
    declaration.specifiers init.declarator.list;         ②
```

Accordingly, the head of the "declaration" is formed by the head of the "declaration-specifiers". The "declaration-specifiers" is the sequence of the next terminal symbol and the terminal-symbol sequence as shown by the proposition 5.

```
AUTO REGISTER STATIC EXTERN TYPEDEF
VOID CHAR SHORT INT LONG FLOAT DOUBLE SIGNED
UNSIGNED
typedef.name
CONST VOLATILE (above, individual token)
the token sequence S.U.E identifier {..}          ↑
the token sequence S.U.E {..}                     A
the token sequence S.U.E identifier               ↓
```

The token "{" is not included in the head of these tokens. Accordingly, the token is not positioned at the head of the "declaration-specifiers", i.e., "declaration".

Accordingly, when reading the head of the "declaration" in the "next" state in the "wait-A", the read position of the token is returned and the process is returned to the initial state. After this process, the "wait-A" reads the same "declaration" from the head.

When the declaration" is input in the "wait-A", the process reads the input until the last portion of the "declaration", and becomes the "next" state.

As explained above, the same operation is performed until the "declaration" continues, and the last state becomes the "next" state.

Proposition 19

The program analyzer inputs the "function-definition", any one of the next items occurs.

(a) The DD-detection process is finished by the DD detection, the following started identification process detects the token "{" and the process is finished. The following started "wait-B" detects the token "}" and the process is finished.

(b) The DD-detection process is finished by the DD detection, the successively started identification process is finished when detecting the DS detection. The successively started "wait-A" detects the tokens ";" and "{" and the process is finished. Further, the successively started "wait-A" detects the tokens ";" and "{" and the process is finished. Further, the successively started "wait-B" detects the token "}" and the process is finished.

```
input: function.definition
operation: DD-detection—>DD - identification —> {-wait-B—>}
         process process
         DD-detection—>DD - identification —>DS -
         process process
             -wait-A —> ; {-wait-B—>}
Proof
```

The rule which has the "function-definition" as the left-hand is as follows.

```
function.definition;
declaration.specifiers_opt
declarator compound.statement                    ①
declaration.specifiers_opt
declarator declaration.list compound.statement   ②
```

In the program analyzer, first the DD-detection process is started.

In the case of the case ①, when the "declaration-specifiers" which is an optional item is input in the DD-detection process, this is skipped based on the proposition 13.

Further, although the "declarator" is input in the DD-detection process, the process is read until the last portion, and is finished by the DD detection.

Although the successively started identification process inputs the "compound-statement", the token "{" of the head is detected from the definition and the process is finished. Next, the "wait-B" is started.

The rule which has the "compound-statement" as the left-hand is as follows.

compound-statement: {declaration-list$_{opt}$, statement-list$_{opt}$}

From above reason, the "wait-B" inputs the sequence of {declaration-list$_{opt}$, statement-list$_{opt}$}, the "wait-B" performs the counter process after setting of the counter value to "0" based on the definition of the "wait-B". The process is finished when reading the token "}" in the state that the counter value becomes "0".

The "wait-B" is not finished based on the "declaration-list" and the symbol "}" in the "statement-list". Since the symbol "}" is the right symmetric symbol, when this symbol is included in the terminal-symbol sequence which is derived from the "declaration-list", the right symmetric symbol corresponding to the symbol "}" exists in the left side. Accordingly, the counter value between the symbol "{" and "}" is more than "1". Therefore, the counter value at the read of the symbol "}" is more than "1". Accordingly, the "wait-B" is skipped until the last of the "declaration-list". Further, the last counter value is "1". The same process as above is given to the "statement-list".

Accordingly, the "declaration-list" of the right side in the "compound-statement" and the "statement-list" are skipped. Further, the last symbol "}" is read in the state of the counter value "0", and this is detected from the definition and the process is completed.

From the above explanation, in the case of the case ①, the case (a) occurs.

DD {}

In the case of the case ②, when the "declaration-specifiers" which is the optional item is input in the DD-detection process, this is skipped based on the proposition 13.

When the "declaration" is input in the DD detection process, as well as the case ①, the process is finished by the DD detection after the above is read until the last portion. Further, the identification process is started. When the "declaration-list" is input, the identification process is finished by the DS detection based on the Proposition 18, the successively started "wait-A" reads until the last portion of the process, and becomes the "next" state.

Further, the "wait-A" inputs the "compound-statement" in the "next" state. Since the head is the symbol "{", the process is finished from the definition of the "wait-A". The successively started "wait-B" inputs the sequence of the "declaration-list$_{opt}$" and "statement-list$_{opt}$", and as well as the case ①, the last symbol "}" is detected and the process is finished. QED The justifiability of the program analyzer according to of the present invention can be proved based on the above explanation.

As explained above, according to the present invention, it is not necessary to analyze the program in accordance with the grammatical rule of the C-program language, and it is not necessary to use the symbolic information which are obtained by the compiler. Accordingly, it is possible to obtain the start point of the function which is designated in the C-program language at high speed and high precision.

I claim:

1. A program analyzer which receives a C-source program formed by a unit of a character or a token, referred to as a character/token, and determines whether a part of the C-source program is a declaration or a function definition, said program analyzer comprising:

a DD-detection processor for detecting a direct declarator or the character/token ";" in the outside of the characters/tokens "{" and "}" of the part of the C-source program, and an identification processor for identifying the part of the C-source program based on a result of the detection by the DD-detection processor, by determining the part of the C-source program as the declaration when the DD-detection processor detects the character/token ";", determining the part of the C-source program as the declaration when the DD-detection processor detects the direct declarator and further detects that the next character/token of the direct declarator is one of the characters/tokens "=", "," and ";", and determining the part of the C-source program as the function definition when the DD-detection processor detects the direct declarator and further detects that the next character/token of the direct declarator is not one of the characters/tokens "=", "," and ";", to thereby determine a start position of the function definition in the C-source program.

2. A program analyzer as claimed in claim 1, wherein said DD-detection processor waits for the identifier or the character/token "(", or ";" which is not positioned just after the identifiers "struct", "union" or "enum" in the outside of the characters/tokens "{" and "}" of the part of the C-source program, skips the sequence of the characters/tokens including "(..)" and "[..]" which follow the identifier, when detecting the identifier which is not positioned just after the characters/tokens "struct", "union" or "enum" in the outside of the characters/tokens "{" and "}" of the part of the C-source program, detects the direct declarator in the last of the skipped portion, further skips the sequence of the characters/tokens including "(..)" and "[..]" which follows the token ")" when detecting the token "(" and further detecting the token ")" which corresponds to the token "(" in the outside of the characters/tokens "{" and "}" of the part of the C-source program, and further detects the direct declarator in the last of the skipped portion.

3. A program analyzer as claimed in claim 1, wherein said DD-detection processor waits for the identifier, or the character/token ";" which is not positioned just after the characters/tokens "struct", "union" or "enum" in the outside of the characters/tokens "{" and "}" of the part of the C-source program, skips the sequence of the characters/tokens including ")", "(..)" and "[..]" which follows the identifier when detecting the identifier which is not positioned just after the identifiers "struct", "union" or "enum" in the outside of the characters/tokens "{" and "}" of the part of the C-source program, and detects the direct declarator in the last of the skipped portion.

4. A program analyzer as claimed in claim 1, wherein said program analyzer further comprises an end position detecting unit, the identification processor determines the part of program until that position as one declaration when the DD-detection processor detects the character/token ";", determines the program until that position as one declaration when the DD-detection processor detects the direct declarator, and when the next input of the direct declarator is the character/token ";", detects the character/token ";" which occurs in the outside of a symmetrical symbol when the DD-detection processor detects the direct declarator, and when the next input of the direct declarator indicates the character/token "=" or ";", further determines the program until that position as one declaration, further detects the character/token "}" which corresponds to the character/token "{", when the DD-detection processor detects the direct declarator, and when the next input of the direct declarator is the character/token "{", and still further determines the program until that position as one function definition, and when the DD detection processor detects the direct declarator, and the next input of the direct declarator is not the characters/tokens ";", "=", ",", and "{", the end position detecting unit detects a consecutive pair of the character/token which occurs in the outside of the symmetric symbol, further detects the character/token "}" which becomes the character/token "{", and determines the program until that position as one function definition.

5. A program analyzer as claimed in claim 4, wherein said program analyzer further defines symbols "( )", "{ }", "[ ]", """" and "''" as symmetric symbols.

6. A program analyzer as claimed in claim 5, wherein said program analyzer does not handle symbols """" which is included in the symbol "\"" and the symbol "''" which is included in the symbol "\'" as the symmetric symbol.

7. A program analyzer as claimed in claim 1, wherein said program analyzer further comprises a type-definition processor which registers type names into a defined-type name table, the DD-detection processor has a structure which does not handle the type name which is registered in the defined-type name table as the identifier, further has the structure for detecting the character/token "typedef" in the outside of the characters/tokens "{" and "}" of the part of the C-source program, when the DD-detection processor detects the "typedef", the identification processor determines the C-source program as the declaration, the DD-detection processor instructs the start of the type-definition processor, the type-definition processor receives this instruction and registers the identifier following the "typedef" as the type name into the defined type-name table.

8. A program analyzer as claimed in claim 7, wherein said DD-detection processor detects a range of alphabetic/numerical characters as a name which are started from an alphabetic character or an underline, further handles the name as the identifier which is not a keyword of the C-language, and not registered in the defined-type name table.

9. A program analyzer as claimed in claim 7, wherein said program analyzer further comprises a start position saving area and a function definition table, when the DD-detection processor detects an optional character/token, the analyzer saves the position information of the character/token of the C-source program into the start position saving area, and after, when the DD-detection processor detects the direct declarator, further when the identification processor determines the function definition and its range, the analyzer moves the token position information which is previously saved into the start position saving area into the function definition table, and further moves the identifier in which the DD-detection processor previously detects the direct declarator into the function definition table, still further registers the function name and the range of the function definition in the function definition table.

10. A program analyzer as claimed in claim 7, further comprising a filter processor which inputs the C-source program from a head thereof, sequentially determines the token range from the character sequence which forms the C-source program, and transfers the token information, which at least includes a kind of token and column position at the program of the token head character, into the DD-detection processor, the identification processor or the type definition processor.

11. A program analyzer as claimed in claim 10, wherein said filter processor (2a) has a normal mode and a transparent mode, transfers all characters/tokens in the normal mode, and does not transfer the range of the corresponding symmetric symbols "{ }", "[ ]", """" and "''" including both ends as the character/token in the transparent mode.

12. A program analyzer as claimed in claim 1, wherein said program analyzer further comprises a scanner program means, the scanner program means inputs the C-source program from a head thereof, sequentially determines the range of the token from the character sequence which forms the C-source program, and transfers the token information which at least includes a kind of token and column position in the program of the head character of the token.

13. A program analyzer as claimed in claim 12, wherein said scanner program means has a normal mode and a transparent mode, transfers all defined characters/tokens in the normal mode, and does not transfer the range of the corresponding symmetric symbols "{}", "[]", """"" and "' '" including both ends as the character/token in the transparent mode.

14. A program analyzer which receives a C-source program formed by a unit of a character or a token, referred to as a character/token, and determines whether a part of the C-source program indicates a declaration or a function definition, said program analyzer comprising:

a DD-detection processor for detecting a direct declarator or the character/token ";" in the outside of the characters/tokens "{" and "}" of the part of the C-source program, and an identification processor for identifying the part of the C-source program based on a result of the detection by the DD-detection processor, by determining the part of the C-source program as the declaration when the DD-detection processor detects the character/token ";", determining the part of the C-source program as the declaration when the DD-detection processor detects the direct declarator and further detects that the next of a first identifier of the direct declarator is "(" and the next character/token of the direct declarator indicates "," or ";", determining the part of the C-source program as the function definition when the DD-detection processor detects the direct declarator and further detects that the next character/token of the direct declarator are not the characters/tokens "," and ";" to thereby determine a start position of the function definition in the C-source program, and determining the part of the C-source program as the declaration when the DD-detection processor detects the direct declarator and further detects that the next of the first identifier of the direct declarator is not the character/token "(".

15. A program analyzer as claimed in claim 14, wherein said DD-detection processor waits for the identifier or the character/token "(", or ";" which is not positioned just after the identifiers "struct", "union" or "enum" in the outside of the characters/tokens "{" and "}" of the part of the C-source program, skips the sequence of the characters/tokens including "(..)" and "[..]" which follow the identifier, when detecting the identifier which is not positioned just after the characters/tokens "struct", "union" or "enum" in the outside of the characters/tokens "{" and "}" of the part of the C-source program, detects the direct declarator in the last of the skipped portion, further skips the sequence of the characters/tokens including "(..)" and "[..]" which follows the token ")" when detecting the token "(" and further detecting the token ")" which corresponds to the token "(" in the outside of the characters/tokens "{" and "}" of the part of the C-source program, and further detects the direct declarator in the last of the skipped portion.

16. A program analyzer as claimed in claim 14, wherein said DD-detection processor waits for the identifier, or the character/token ";" which is not positioned just after the characters/tokens "struct", "union" or "enum" in the outside of the characters/tokens "{" and "}" of the part of the C-source program, skips the sequence of the characters/tokens including ")", "(..)" and "[..]" which follows the identifier when detecting the identifier which is not positioned just after the identifiers "struct", "union" or "enum" in the outside of the characters/tokens "{" and "}" of the part of the C-source program, and detects the direct declarator in the last of the skipped portion.

* * * * *

UNITED STATES PATENT AND TRADEMARK OFFICE
CERTIFICATE OF CORRECTION

PATENT NO. : 5,649,201
DATED : July 15, 1997
INVENTOR(S) : KITADATE

It is certified that error appears in the above-identified patent and that said Letters Patent is hereby corrected as shown below:

Col. 4, line 54, before "and" insert --","--.

Col. 8, line 21, change "0n" to --On--.

Col. 13, line 63, change ""X$_i$, Y$_i$"" to --"x$_i$, y$_i$"--;
line 65, change ""Y$_i$"" to --"y$_i$"--.

Col. 14, line 14, change "A"]"" to --"]"--;
line 18, after "When" insert --$a$--;
line 37, change ""Y$_i$"" to --"y$_i$"--;
line 38, change "0n" to --On--;
line 59, change ""Y$_i$"" to --"y$_i$"--.

Col. 15, line 8, change " = 1" to -- + 1--;
line 33, change "to" to --$a$ to $\omega$--;
line 63, change "$a$" to --$\omega$--.

Col. 17, line 17, change "*next"" to --"next"--.

Col. 19, line 51, change " == !=" to -- = = !=--.

Col. 20, line 13, after "symbol" insert --";"--;
on a separate line, after line 18 "Proposition 7", add --DD-detection process skips the pointer.--.

UNITED STATES PATENT AND TRADEMARK OFFICE
CERTIFICATE OF CORRECTION

PATENT NO. : 5,649,201
DATED : July 15, 1997
INVENTOR(S) : KITADATE

It is certified that error appears in the above-identified patent and that said Letters Patent is hereby corrected as shown below:

Col. 24, line 10, start a new paragraph with "③";
       line 41, change "proposition 14" to --Proposition 14--.

Signed and Sealed this

Ninth Day of December, 1997

Attest:

BRUCE LEHMAN

*Attesting Officer*　　　*Commissioner of Patents and Trademarks*